United States Patent
Ali et al.

(10) Patent No.: US 12,483,312 B2
(45) Date of Patent: *Nov. 25, 2025

(54) REPEATER CONFIGURATION FOR CHANNEL STATE INFORMATION REFERENCE SIGNAL

(71) Applicant: Lenovo (United States) Inc., Morrisville, NC (US)

(72) Inventors: Ali Ramadan Ali, Kraiburg am Inn (DE); Ankit Bhamri, Rödermark (DE); Ahmed Hindy, Aurora, IL (US); Sher Ali Cheema, Ilmenau (DE); Vijay Nangia, Woodridge, IL (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,003

(22) Filed: Jun. 14, 2024

(65) Prior Publication Data

US 2024/0413872 A1  Dec. 12, 2024

Related U.S. Application Data

(63) Continuation of application No. 17/537,279, filed on Nov. 29, 2021, now Pat. No. 12,047,143.

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0048* (2013.01); *H04W 24/10* (2013.01); *H04L 5/0007* (2013.01); *H04W 16/26* (2013.01)

(58) Field of Classification Search
CPC .. H04B 7/0456; H04B 7/0482; H04B 7/0617; H04B 7/0626; H04L 5/0007;
(Continued)

(56) References Cited

U.S. PATENT DOCUMENTS

2019/0124696 A1    4/2019  Islam et al.
2020/0366363 A1*  11/2020  Li .......................... H04L 5/003
(Continued)

FOREIGN PATENT DOCUMENTS

WO      2023053094 A1    4/2023

OTHER PUBLICATIONS

3Gpp, "3rd Generation Partnership Project; Technical Specification Group Radio Access Network; NR; Physical channels and modulation (Release 16)", 3GPP TS 38.211 V16.7.0, Sep. 2021, pp. 1-134.
(Continued)

*Primary Examiner* — Michael Thier
*Assistant Examiner* — Prince A Mensah
(74) *Attorney, Agent, or Firm* — Kunzler Bean & Adamson

(57) ABSTRACT

Apparatuses, methods, and systems are disclosed for repeater configuration for channel state information reference signal. An apparatus includes a transceiver that receives a first configuration from a base station of a mobile wireless communication network, the first configuration comprising channel state information reference signal ("CSI-RS") configuration information for amplifying and forwarding CSI-RS beams to a user equipment ("UE") device from the repeater node. The transceiver receives a second configuration from the base station, the second configuration comprising configuration information for performing measurement and reporting of the CSI-RS beams. The transceiver receives repeater-specific CSI-RS to be forwarded to the UE
(Continued)

device and transmits the repeater-specific CSI-RS to the UE device according to the first configuration.

20 Claims, 14 Drawing Sheets

(51) Int. Cl.
*H04W 24/10* (2009.01)
*H04W 16/26* (2009.01)

(58) Field of Classification Search
CPC .... H04L 5/0048; H04L 5/0094; H04W 16/26; H04W 24/10; H04W 72/0453; H04W 74/0833; H04W 92/20; H04W 74/0808
See application file for complete search history.

(56) References Cited

U.S. PATENT DOCUMENTS

| | | |
|---|---|---|
| 2021/0067237 A1 | 3/2021 | Sampath et al. |
| 2021/0068050 A1 | 3/2021 | Sampath et al. |
| 2022/0070940 A1 | 3/2022 | Taherzadeh Boroujeni et al. |
| 2022/0159684 A1 | 5/2022 | Mo et al. |
| 2022/0231751 A1 | 7/2022 | Grant et al. |
| 2022/0399934 A1 | 12/2022 | Bai et al. |
| 2023/0084692 A1* | 3/2023 | Luo .................. H04W 74/006 |
| 2023/0130003 A1 | 4/2023 | Ali et al. |

OTHER PUBLICATIONS

3GPP, "3rd Generation Partnership Project; Technical Specification Group Radio Access Network; NR; Physical layer procedures for control (Release 16)", 3GPP TS 38.213 V16.7.0, Sep. 2021, pp. 1-188.

3GPP, "3rd Generation Partnership Project; Technical Specification Group Radio Access Network; NR; Physical layer procedures for data (Release 16)" 3GPP TS 38.214 V16.7.0, Sep. 2021, pp. 1-172.

* cited by examiner p=4 (density), FDM + TDM with 2 ports p=2 (density), FDM + TDM with 4 ports p=1 (density), TD-CDM with 2 ports p=1 (density), TD-CD4 with 4 ports p=4 (density), FDM+TD-CDM with 2 ports p=2 (density), FDM + TD-CDM with 4 ports

REPEATER CONFIGURATION FOR CHANNEL STATE INFORMATION REFERENCE SIGNAL

FIELD

The subject matter disclosed herein relates generally to wireless communications and more particularly relates to repeater configuration for channel state information reference signal.

BACKGROUND

In wireless networks, repeaters can be used to receive and transmit signals to boost reception within the wireless network. Smart repeaters may be used to extend network coverage in both uplink and downlink communication with the help of more control information from the network for efficient amplify and forward mechanism that make use of time and spatial information of the Uu link. However, signalling this control information for each time slot may put a large burden on the control signalling overhead. Furthermore, channel state information reference signal ("CSI-RS") resources may be mapped in frequency and time with configurations that may include code division ("CD") in frequency-division multiplexing ("FDM") and/or in time-division multiplexing ("TDM") based on multiple antenna ports that are used to transmit CSI-RS to the user equipment ("UE").

BRIEF SUMMARY

Disclosed are procedures for repeater configuration for channel state information reference signal. Said procedures may be implemented by apparatus, systems, methods, and/or computer program products.

In one embodiment, a first apparatus includes a transceiver that receives a first configuration from a base station of a mobile wireless communication network, the first configuration comprising channel state information reference signal ("CSI-RS") configuration information for amplifying and forwarding CSI-RS beams to a user equipment ("UE") device from the repeater node.

In one embodiment, the transceiver receives a second configuration from the base station, the second configuration comprising configuration information for performing measurement and reporting of the CSI-RS beams. In one embodiment, the transceiver receives repeater-specific CSI-RS to be forwarded to the UE device and transmits the repeater-specific CSI-RS to the UE device according to the first configuration.

In one embodiment, a first method includes receiving a first configuration from a base station of a mobile wireless communication network, the first configuration comprising channel state information reference signal ("CSI-RS") configuration information for amplifying and forwarding CSI-RS beams to a user equipment ("UE") device from the repeater node. In one embodiment, the first method includes receiving a second configuration from the base station, the second configuration comprising configuration information for performing measurement and reporting of the CSI-RS beams. In one embodiment, the first method includes receiving repeater-specific CSI-RS to be forwarded to the UE device and transmits the repeater-specific CSI-RS to the UE device according to the first configuration.

In one embodiment, a second apparatus includes a transceiver that transmits a first configuration to a repeater node of a mobile wireless communication network, the first configuration comprising channel state information reference signal ("CSI-RS") configuration information for amplifying and forwarding CSI-RS beams to a user equipment ("UE") device from the repeater node. In one embodiment, the transceiver transmits a second configuration to the repeater node, the second configuration comprising configuration information for performing measurement and reporting of the CSI-RS beams. In one embodiment, the transceiver transmits repeater-specific CSI-RS to the repeater node to be forwarded to the UE device and transmits an indication to the UE device to report repeater-specific CSI-RS measurements to the base station.

In one embodiment, a second method includes transmitting a first configuration to a repeater node of a mobile wireless communication network, the first configuration comprising channel state information reference signal ("CSI-RS") configuration information for amplifying and forwarding CSI-RS beams to a user equipment ("UE") device from the repeater node. In one embodiment, the second method includes transmitting a second configuration to the repeater node, the second configuration comprising configuration information for performing measurement and reporting of the CSI-RS beams. In one embodiment, the second method includes transmitting repeater-specific CSI-RS to the repeater node to be forwarded to the UE device and transmitting an indication to the UE device to report repeater-specific CSI-RS measurements to the base station.

In one embodiment, a third apparatus includes a transceiver that receives, from a base station of a mobile wireless communication network, an indication to report repeater-specific reference signal ("RS") measurements associated with a repeater node and repeater-specific channel state information RS ("CSI-RS") and transmits, to the base station, repeater-specific RS measurements associated with the received repeater-specific CSI-RS.

In one embodiment, a third method includes receiving, from a base station of a mobile wireless communication network, an indication to report repeater-specific reference signal ("RS") measurements associated with a repeater node and repeater-specific channel state information RS ("CSI-RS") and transmits, to the base station, repeater-specific RS measurements associated with the received repeater-specific CSI-RS.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
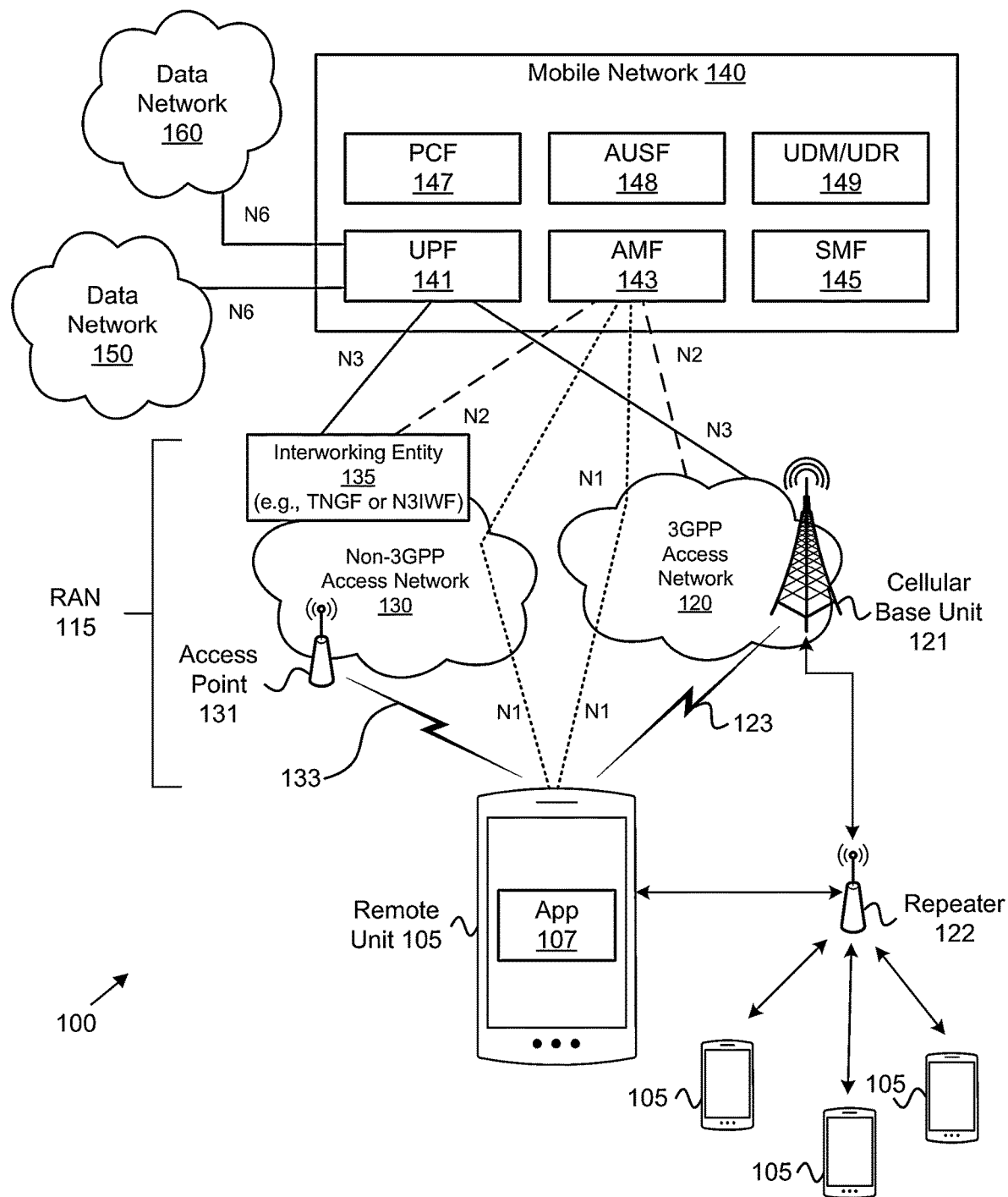
FIG. 1 is a schematic block diagram illustrating one embodiment of a wireless communication system for repeater configuration for channel state information reference signal.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for repeater configuration for channel state information reference signal. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Smart repeaters are currently gaining a momentum in Rel18 discussions. This new type of RF repeaters aims at extending the network coverage in both uplink and downlink communication with the help of more control information from the network for efficient amplify and forward mechanism that make use of time and spatial information of the Uu link. This information may include time division duplex ("TDD") switching as well as common and UE dedicated spatial information for beamforming. However, signaling this control information for each time slot may put a large burden on the control signaling overhead. Furthermore, in Rel16/15, channel state information reference signal ("CSI-RS") resources may be mapped in frequency and time with configurations that may include code division ("CD") in frequency-division multiplexing ("FDM") and/or in time-division multiplexing ("TDM") based on multiple antenna ports that are used to transmit CSI-RS to the user equipment ("UE"). This may require mapping between the CSI-RS ports and antennas/panels.

If a repeater without baseband capability is present in the network, it may receive and forward the CSI-RS based on time and/or directional information from a base station, e.g., gNB. However, it cannot interpret the frequency allocation of CSI-RS or the FD-CDM configuration. Furthermore, the UE reports CSI to the gNB of the received CSI-RS from the repeater and not the received CSI-RS by the repeater (or the CSI-RS transmitted by the gNB). Therefore, association/mapping between the CSI-RS transmitted from the repeater and CSI-RS transmitted from gNB needs to be applied. In one embodiment, this disclosure describes how the repeater can be configured to efficiently amplify and forward CSI-RS to UE and the corresponding configuration needed at the gNB and repeater.

In this disclosure, apparatuses, methods, and systems are proposed to introduce configuration for the smart repeater(s) to efficiently perform amplify and forward of CSI-RS by:
- Configuring the repeater with CSI-RS resource set that include time information to perform amplify and forward CSI-RS;
- Configuring the repeater to forward each CSI-RS received beam from BS to a certain direction towards the UE;
- Configuring the repeater to combine and forward multiple CSI-RS ports in a symbol to a configured spatial direction;
- Configuring the repeater to measure CSI-RS beams and report cri-rsrp/cri-snr to the BS if the repeater is equipped with base band processing module;
- Configuring multiple repeaters to forward repeater specific RS/CSI-RS; and
- Configuring multiple repeaters to perform simultaneous DL data transmission to a UE based on the reported CSI measurement from the UE of multiple repeater specific RS.

FIG. 1 depicts a wireless communication system 100 for repeater configuration for channel state information reference signal, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a Third Generation Partnership Project ("3GPP") access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one embodiment, the wireless communication system 100 may include a repeater 122, which may be embodied as a network node or device that is configured to extend the coverage of the wireless communication system 100 by repeating, amplifying, forwarding, and/or the like signals between the base unit 121 and a remote unit 105, e.g., a UE. The repeater 122 may include a bi-directional signal amplifier to extend the coverage of a wireless signal in both an uplink and downlink direction. In certain embodiments, the repeater 122 is transparent to the remote unit 105 such that the remote unit 105 communicates via the repeater 122 as if it were communicating directly with the base unit 121. In such an embodiment, there is no need for an access procedure between the remote unit 105 and the repeater 122.

In one implementation, the RAN 120 is compliant with the 5G system specified in the 3GPP specifications. For example, the RAN 120 may be a NextGen RAN ("NG-RAN"), implementing NR Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as User Equipments ("UEs"), subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via UL and DL communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a Packet Gateway ("P-GW"), not shown, in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the Access and Mobility Management Function ("AMF") 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an AMF 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 147 is responsible for unified policy framework, providing policy rules to Control Plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NSSAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MME"), Serving Gateway ("S-GW"), P-GW, Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

In the following descriptions, the terms antenna, panel, antenna panel, device panel and UE panel are used interchangeably. An antenna panel may be a hardware that is used for transmitting and/or receiving radio signals at frequencies lower than 6 GHz, e.g., frequency range 1 ("FR1", i.e., frequencies from 410 MHz to 7125 MHz), or higher than 6 GHz, e.g., frequency range 2 ("FR2", i.e., frequencies from 24.25 GHz to 52.6 GHz) or millimeter wave (mm-Wave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device antenna panel (e.g., of a UE or RAN node) may be a physical or logical antenna array comprising a set of antenna elements or antenna ports that share a common or a significant portion of an RF chain (e.g., in-phase/quadrature ("I/Q") modulator, analog-to-digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping.

A device may report its capability with respect to the "device panel" to the gNB or network. The device capability may include at least the number of "device panels." In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. For example, qcl-Type may take one of the following values:

'QCL-TypeA': {Doppler shift, Doppler spread, average delay, delay spread}

'QCL-TypeB': {Doppler shift, Doppler spread}
'QCL-TypeC': {Doppler shift, average delay}
'QCL-TypeD': {Spatial Rx parameter}.

Spatial Rx parameters may include one or more of: angle of arrival (AoA) Dominant AoA, average AoA, angular spread, Power Angular Spectrum (PAS) of AoA, average AoD (angle of departure), PAS of AoD, transmit/receive channel correlation, transmit/receive beamforming, spatial channel correlation, etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

As background, regarding CSI-RS in NR, e.g., according to TS 38.211, zero-power ("ZP") and non-zero-power ("NZP") CSI-RS are defined. For a non-zero-power CSI-RS configured by the NZP-CSI-RS-Resource information element ("IE") or by the CSI-RS-Resource-Mobility field in the CSI-RS-ResourceConfigMobility IE, the sequence shall be generated, e.g., according to clause 7.4.1.5.2 and mapped to resource elements, e.g., according to clause 7.4.1.5.3.

For a zero-power CSI-RS configured by the ZP-CSI-RS-Resource IE, in one embodiment, the UE shall assume that the resource elements defined in clause 7.4.1.5.3 are not used for physical downlink shared channel ("PDSCH") transmission, e.g., subject to clause 5.1.4.2 of TS 38.214. The UE, in one embodiment, performs the same measurement/reception on channels/signals except PDSCH regardless of whether they collide with ZP CSI-RS or not.

Regarding sequence generation, in one embodiment, the UE shall assume the reference-signal sequence r(m) is defined by:

$$r(m) = \frac{1}{\sqrt{2}}(1 - 2 \cdot c(2m)) + j\frac{1}{\sqrt{2}}(1 - 2 \cdot c(2m + 1))$$

where the pseudo-random sequence c(i) is defined, e.g., in clause 5.2.1. The pseudo-random sequence generator shall be initialized with:

$$c_{init} = \left(2^{10}\left(N_{symb}^{slot}n_{s,f}^{\mu} + l + 1\right)(2n_{ID} + 1) + n_{ID}\right) \bmod 2^{31}$$

at the start of each orthogonal frequency-division multiplexing ("OFDM") symbol where $n_{s,f}^{\mu}$ is the slot number within a radio frame, l is the OFDM symbol number within a slot, and np equals the higher-layer parameter scramblingID or sequenceGenerationConfig.

Regarding mapping to physical resources, in one embodiment, for each CSI-RS configured, the UE shall assume the sequence r(m) being mapped to resources elements $(k, l)_{p,\mu}$ according to:

$$a_{k,l}^{(p,\mu)} = \beta_{CSIRS}w_f(k') \cdot w_t(l') \cdot r_{l,n_{s,f}}(m')$$

$$m' = \lfloor n\alpha \rfloor + k' + \left\lfloor \frac{k\rho}{N_{sc}^{RB}} \right\rfloor$$

$$k = nN_{sc}^{RB} + \bar{k} + k'$$

$$l = \bar{l} + l'$$

$$\alpha = \begin{cases} \rho & \text{for } X = 1 \\ 2\rho & \text{for } X > 1 \end{cases}$$

$$n = 0, 1, \ldots$$

when the following conditions are fulfilled the resource element $(k, l)_{p,\mu}$ is within the resource blocks occupied by the CSI-RS resource for which the UE is configured;

The reference point for k=0 is subcarrier 0 in common resource block 0;

The value of ρ is given by the higher-layer parameter density in the CSI-RS-ResourceMapping IE or the CSI-RS-CellMobility IE and the number of ports X is given by the higher-layer parameter nrofPorts;

The UE is not expected to receive CSI-RS and DM-RS on the same resource elements;

The UE shall assume $\beta_{CSIRS}>0$ for a non-zero-power CSI-RS where $\beta_{CSIRS}$ is selected such that the power offset specified by the higher-layer parameter powerControlOffsetSS in the NZP-CSI-RS-Resource IE, if provided, is fulfilled;

The quantities k', l', $w_f(k')$, and $w_t(l')$ are given by Tables 7.4.1.5.3-1 to 7.4.1.5.3-6, shown below, where each $(\bar{k}, \bar{l})$ in a given row of Table 7.4.1.5.3-1 corresponds to a CDM group of size 1 (no CDM) or size 2, 4, or 8. The CDM type is provided by the higher layer parameter cdm-Type in the CSI-RS-ResourceMapping IE. The indices k' and l' index resource elements within a CDM group;

The time-domain locations $l_0 \in \{0,1, \ldots, 13\}$ and $l_1 \in \{2, 3, \ldots, 12\}$ are provided by the higher-layer parameters firstOFDMSymbolInTime Domain and firstOFDMSymbolInTimeDomain2, respectively, in the CSI-RS-ResourceMapping IE or the CSI-RS-ResourceConfig-Mobility IE and defined relative to the start of a slot;

The frequency-domain location is given by a bitmap provided by the higher-layer parameter frequencyDomainAllocation in the CSI-RS-ResourceMapping IE or the CSI-RS-ResourceConfigMobility IE with the bitmap and value of $k_i$ in Table 7.4.1.5.3-1 given by a. $[b_3 \ldots b_0]$, $k_{i-1}=f(i)$ for row 1 of Table 7.4.1.5.3-1;

b. $[b_{11} \ldots b_0]$, $k_{i-1}=f(i)$ for row 2 of Table 7.4.1.5.3-1;

c. $[b_2 \ldots b_0]$, $k_{i-1}=4f(i)$ for row 4 of Table 7.4.1.5.3-1;

d. $[b_5 \ldots b_0]$, $k_{i-1}=2f(i)$ for all other cases.

where f(i) is the bit number of the $i^{th}$ bit in the bitmap set to one, repeated across every $\lceil 1/\rho \rceil$ of the resource blocks configured for CSI-RS reception by the UE. The starting position and number of the resource blocks in which the UE shall assume that CSI-RS is transmitted are given by the higher-layer parameters freqBand and density in the CSI-RS-ResourceMapping IE for the bandwidth part given by the higher-layer parameter BWP-Id in the CSI-ResourceConfig IE or given by the higher-layer parameters nrofPRBs in the CSI-RS-CellMobility IE where the startPRB given by csi-rs-MeasurementBW is relative to common resource block 0.

The UE shall assume that a CSI-RS is transmitted using antenna ports p numbered according to:

$$p = 3000 + s + jL;$$

$$j = 0, 1, \ldots, N/L - 1$$

$$s = 0, 1, \ldots, L - 1;$$

where s is the sequence index provided by Tables 7.4.1.5.3-2 to 7.4.1.5.3-5, L∈{1,2,4,8} is the CDM group size, and N is the number of CSI-RS ports. The CDM group index j given in Table 7.4.1.5.3-1 corresponds to the time/frequency locations $(\bar{k}, \bar{l})$ for a given row of the table. The CDM groups are numbered in order of increasing frequency domain allocation first and then increasing time domain allocation. For a CSI-RS resource configured as periodic or semi-persistent by the higher-layer parameter resourceType or configured by the higher-layer parameter CSI-RS-CellMobility, the UE shall assume that the CSI-RS is transmitted in slots satisfying.

$$\left(N_{slot}^{frame,\mu}n_f + n_{s,f}^{\mu} - T_{offset}\right) \bmod T_{CSI-RS} = 0$$

where the periodicity $T_{CSI-RS}$ (in slots) and slot offset $T_{offset}$ are obtained from the higher-layer parameter CSI-ResourcePeriodicityAndOffset or slotConfig. The UE shall assume that CSI-RS is transmitted in a candidate slot, e.g., as described in clause 11.1 of TS 38.213.

The UE may assume that antenna ports within a CSI-RS resource are quasi co-located with QCL Type A, Type D (when applicable), and average gain.

TABLE 7.4.1.5.3-1

CSI-RS locations within a slot.

| Row | Ports X | Density ρ | cdm-Type | $(\bar{k}, \bar{l})$ | CDM group index $j$ | k' | l' |
|---|---|---|---|---|---|---|---|
| 1 | 1 | 3 | noCDM | $(k_0, l_0), (k_0 + 4, l_0), (k_0 + 8, l_0)$ | 0, 0, 0 | 0 | 0 |
| 2 | 1 | 1, 0.5 | noCDM | $(k_0, l_0)$, | 0 | 0 | 0 |
| 3 | 2 | 1, 0.5 | fd-CDM2 | $(k_0, l_0)$, | 0 | 0, 1 | 0 |
| 4 | 4 | 1 | fd-CDM2 | $(k_0, l_0), (k_0 + 2, l_0)$ | 0, 1 | 0, 1 | 0 |
| 5 | 4 | 1 | fd-CDM2 | $(k_0, l_0), (k_0, l_0 + 1)$ | 0, 1 | 0, 1 | 0 |
| 6 | 8 | 1 | fd-CDM2 | $(k_0, l_0), (k_1, l_0), (k_2, l_0), (k_3, l_0)$ | 0, 1, 2, 3 | 0, 1 | 0 |
| 7 | 8 | 1 | fd-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | cdm4-FD2-TD2 | $(k_0, l_0), (k_1, l_0)$ | 0, 1 | 0, 1 | 0, 1 |
| 9 | 12 | 1 | fd-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | cdm4-FD2-TD2 | $(k_0, l_0), (k_1, l_0), (k_2, l_0)$ | 0, 1, 2 | 0, 1 | 0, 1 |
| 11 | 16 | 1, 0.5 | fd-CDM2 | $(k_0, l_0), (k_1, l_0), (k_2, l_0), (k_3, l_0), (k_0, l_0 + 1),$ $(k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | cdm4-FD2-TD2 | $(k_0, l_0), (k_1, l_0), (k_2, l_0), (k_3, l_0)$ | 0, 1, 2, 3 | 0, 1 | 0, 1 |
| 13 | 24 | 1, 0.5 | fd-CDM2 | $(k_0, l_0), (k_1, l_0), (k_2, l_0), (k_0, l_0 + 1), (k_1, l_0 + 1),$ $(k_2, l_0 + 1), (k_0, l_1), (k_1, l_1), (k_2, l_1), (k_0, l_1 + 1),$ $(k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | cdm4-FD2-TD2 | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | cdm8-FD2-TD4 | $(k_0, l_0), (k_1, l_0), (k_2, l_0)$ | 0, 1, 2 | 0, 1 | 0, 1, 2, 3 |
| 16 | 32 | 1, 0.5 | fd-CDM2 | $(k_0, l_0), (k_1, l_0), (k_2, l_0), (k_3, l_0), (k_0, l_0 + 1),$ $(k_1, l_0 + 1), (k_2, l_0 + 1), (k_3, l_0 + 1), (k_0, l_1),$ $(k_1, l_1), (k_2, l_1), (k3, l_1), (k_0, l_1 + 1), (k_1, l_1 + 1),$ $(k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | cdm4-FD2-TD2 | $(k_0, l_0), (k_1, l_0), (k_2, l_0), (k_3, l_0), (k_0, l_1),$ $(k_1, l_1), (k_2, l_1), (k_3, l_1)$ | 0, 1, 2, 3, 4, 5, 6, 7 | 0, 1 | 0, 1 |
| 18 | 32 | 1, 0.5 | cdm8-FD2-TD4 | $(k_0, l_0), (k_1, l_0), (k_2, l_0), (k_3, l_0)$ | 0, 1, 2, 3 | 0, 1 | 0, 1, 2, 3 |

In general, the subject matter disclosed herein describes configuring a smart repeater to efficiently amplify and forward CSI-RS beams for beam refinement or management or CSI feedback purposes, which can be based on sending narrower beams within a wider beam, for example, narrower CSI-RS beams within a wide synchronization signal block ("SSB") beam that is used for the connection between the UE and the network.

Figure 2:
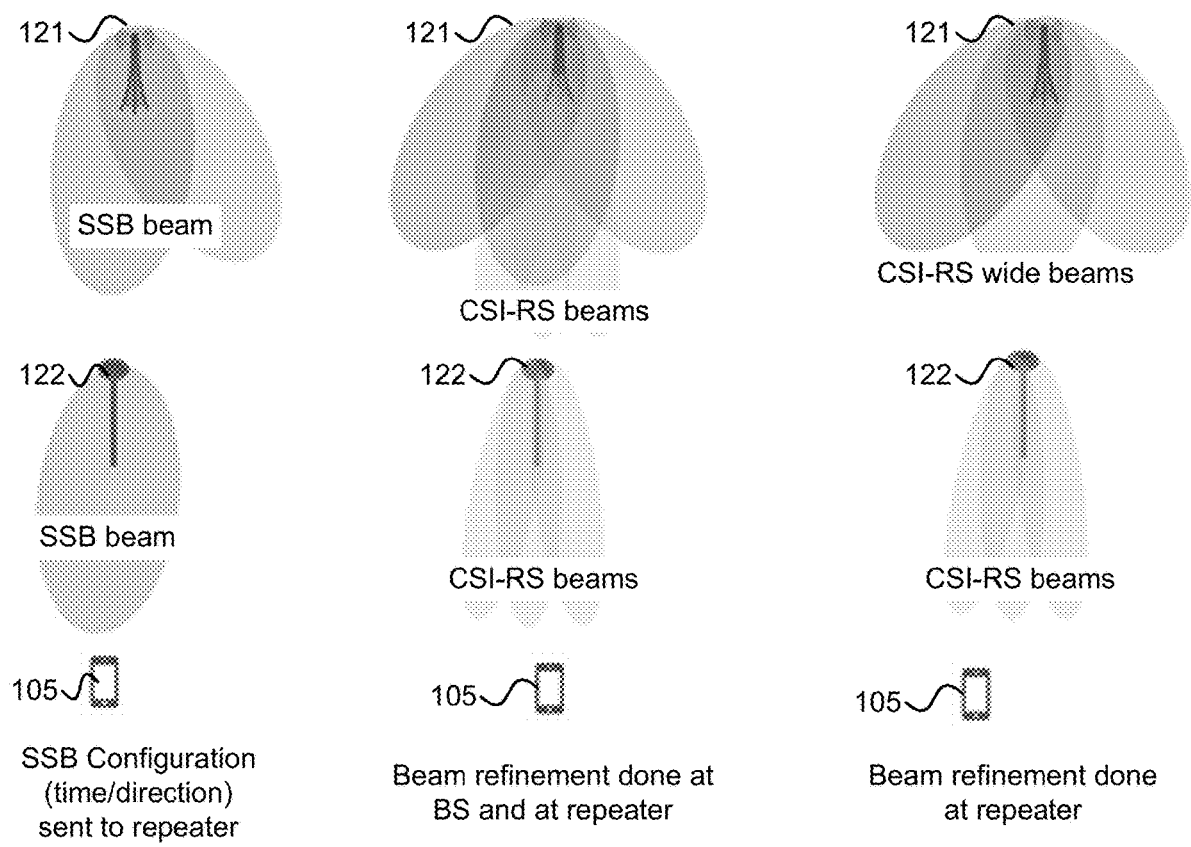
FIG. 2 is a diagram illustrating CSI-RS transmission in the presence of a repeater.

The base station ("BS") configures the UE to receive, measure, and report multiple CSI-RS beams within the SSB beam for BS to decide on at least one of the rank, the spatial filter, the precoding scheme, and/or the like for PDSCH/PDCCH transmission. The transmission of CSI-RS from the BS in the presence of repeater that is configured with time and spatial information to amplify and forward CSI-RS may imply that the repeater receives multiple CSI-RS although it is in a fixed location relative to the BS. In the following embodiments, multiple options can be adopted to efficiently amplify and forward CSI-RS for beam refinement or other BM/MIMO purposes. Some options are shown in FIG. 2.

In this disclosure, the following aspects are discussed:
Configuring the smart repeater with CSI-RS resource set configuration;
Configuring the smart repeater to measure and report CSI-RS for baseband capable repeaters;
Configure the smart repeater to map received CSI-RS beams to the transmitted/forwarded CSI-RS beams; and
Configure the UE to measure and report CSI-RS from multiple repeaters for repeater selection.

For establishing the control communication link between the network and the smart repeater, in one embodiment, BS and smart repeater may synchronize to each other by means of a dedicated synchronization signal, an external synchronization source (e.g., GNSS), synchronization signals from the BS on the Uu interface, and/or a combination thereof.

In one embodiment directed to a repeater without measurement capability, e.g., no baseband, a smart repeater(s) with no baseband capability receives from the BS a configuration for amplifying and forwarding CSI-RS. In one example, the BS configuration may indicate a set of OFDM symbols/slots to amplify and forward. In one embodiment, the set of OFDM symbols comprises at least one CSI-RS.

In one embodiment, the repeater receives a configuration for forwarding the CSI-RS to the UE. The configuration, in one embodiment, includes time information of the location of the slots with CSI-RS and beam information for each CSI-RS symbol/slot. Since the repeater cannot treat (e.g., cannot perform amplify and forward on only a subset of a subcarriers within a carrier (e.g., bandwidth part ("BWP"))) the frequency domain information (e.g., frequency domain allocation of CSI-RS ports), the repeater forwards multiple frequency domain-code division multiplexed ("FD-CDMed") CSI-RS in a same direction (e.g., using same DL beam/TCI state/spatial transmission filter).

Figure 3A:
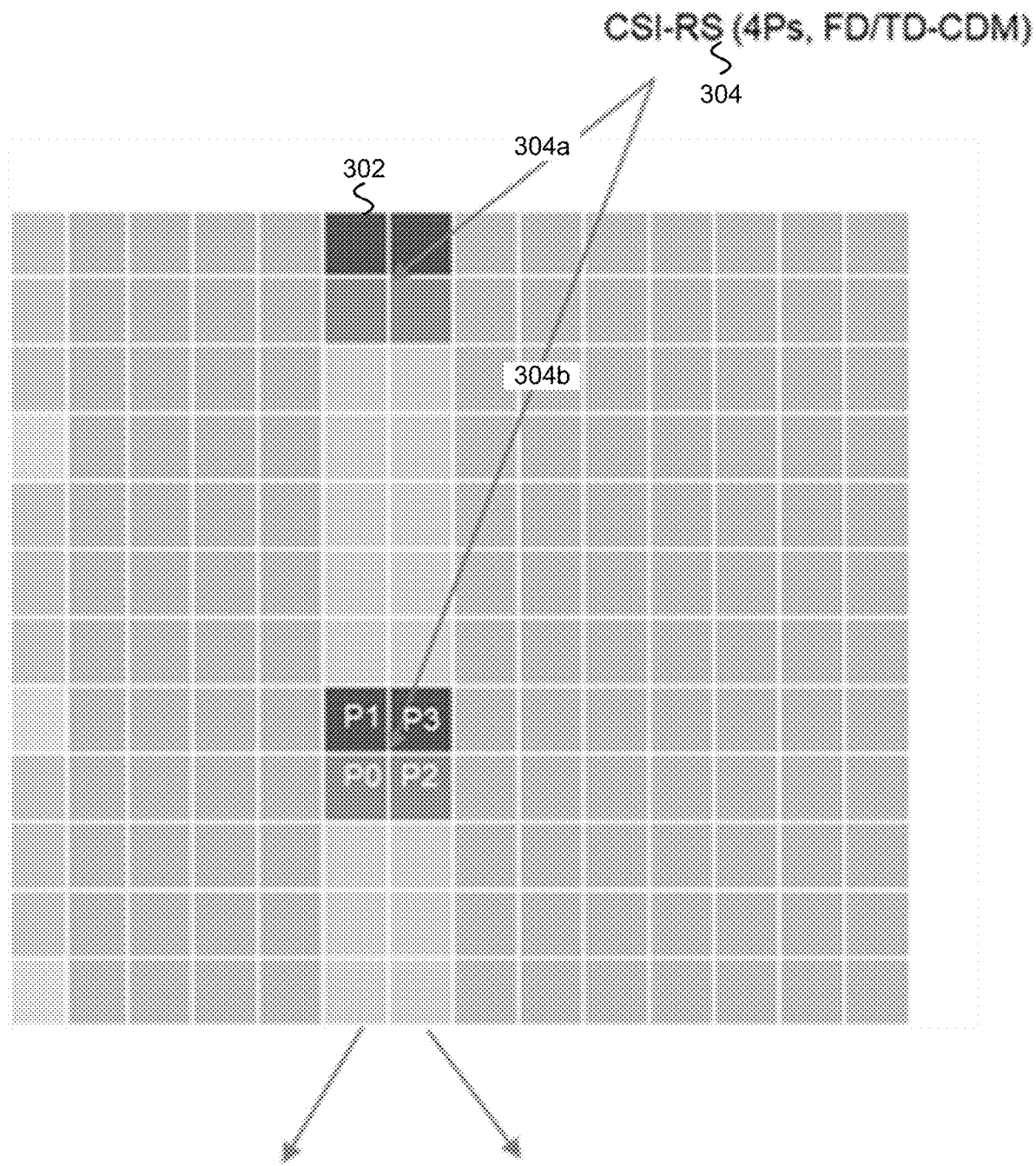
FIG. 3A is a diagram illustrating one example of combining multiple FD-CDMed CSI-RS beams.

For one OFDM symbol, in one embodiment, BS configures the repeater to use one antenna port group/panel to forward the CSI-RS. In one embodiment, the selected antennas/panel at the repeater may be associated with one or more of the antenna ports used to carry CSI-RS in that symbol, as illustrated in FIG. 3A.

In one embodiment, CSI-RS ports 302 per CSI-RS resource are grouped into two or more groups 304, wherein the grouping is configured by the network, or set by a rule, or a combination thereof. In one example, the CSI-RS ports transmission corresponding to a first group 304a of the two groups of CSI-RS ports is separated by x symbols from the CSI-RS ports transmission corresponding to a second 304b of the two groups of CSI-RS ports.

In one example, x=1,2,3,4 symbols. In another implementation the selected antenna(s)/panel at the repeater are associated with a combination of the spatial information of different CSI-RS ports in that symbol, for example the repeater is configured to forward the CSI-RS beams received from BS of that time slot to a direction which is an average value of the CSI-RS beams directions sent from BS. In one example, the average value of the CSI-RS beams directions may be indicated to the smart repeater comprising launch angles (transmit azimuth angle and/or elevation angle) or transmit/DL TCI state/spatial transmission filter.

Figure 3B:
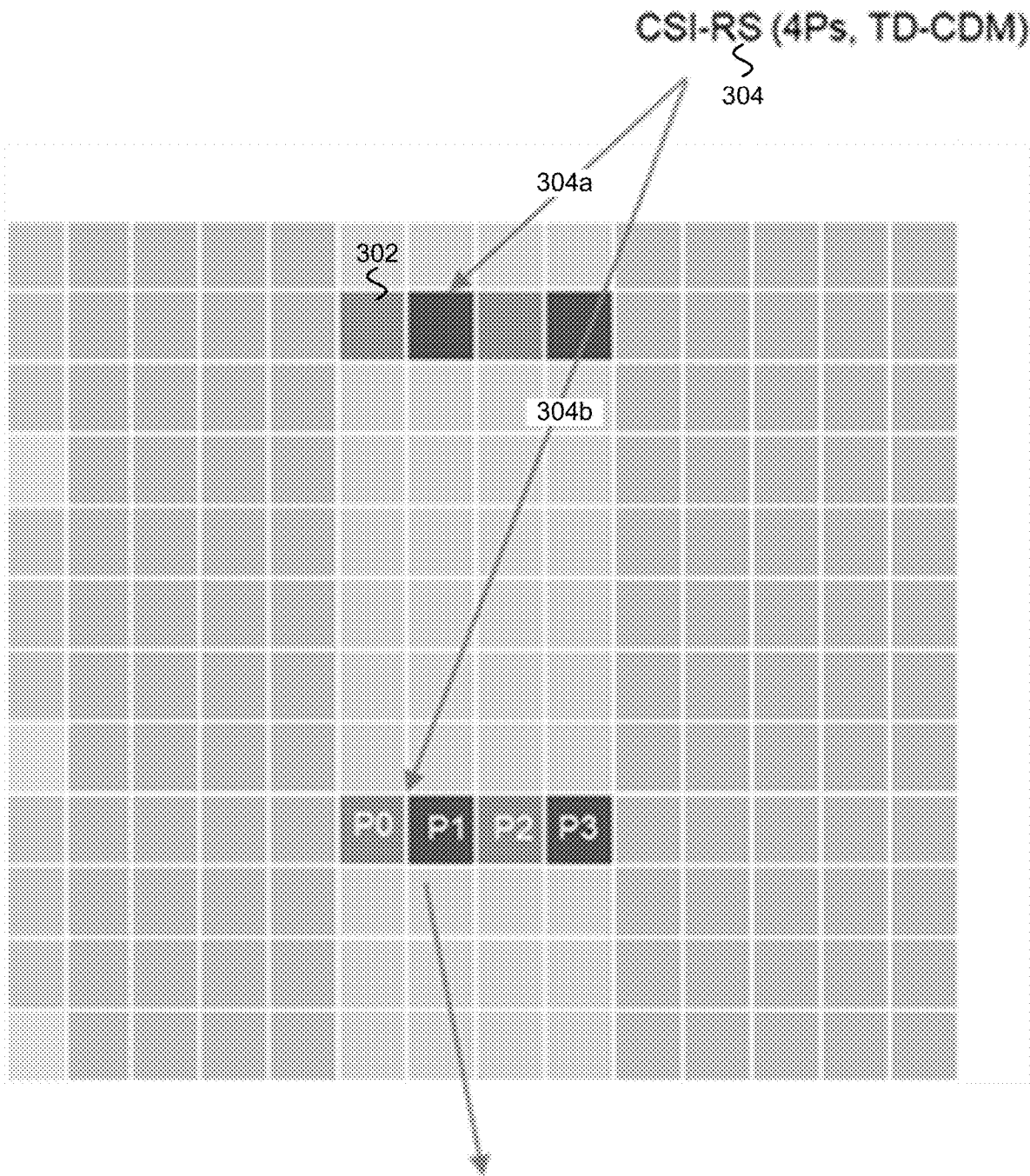
FIG. 3B is a diagram illustrating one example of restriction of CSI-RS configuration to TD-CDMed CSI-RS beams.

In an alternative embodiment, upon identifying or determining that the UE is connected (or would benefit from a connection, e.g., close proximity/improved reference signal received power ("RSRP")/signal to interference plus noise ratio ("SINR")) through a smart repeater, the BS restricts the CSI-RS beam configuration to the time domain, such that CSI-RS resource elements ("REs") for different per-antenna-port CSI-RS are mapped to different OFDM symbols, as shown in FIG. 3B.

In one embodiment, beam information for each port 402 is signalled to the repeater to apply for different OFDM symbols. This reduces the total possible antenna ports of CSI-RS, however more symbols can be used to cover more CSI-RS antenna ports. In one example, no CDM (e.g., in frequency domain and/or time-domain) across different per-antenna-port CSI-RS on the same set of REs are used/indicated.

In an alternative embodiment, the BS sends the CSI-RS to the repeater on different symbols in the same direction, as the repeater and BS are in fixed locations. The BS may use the same spatial filter used for the corresponding SSB. From the BS and UE perspectives, the CSI-RS is a single port CSI-RS. For beam refinement at the repeater-UE link, the BS configures the repeater to apply specific beam information to each symbol carrying CSI-RS, such that the UE receives different CSI-RS beams. In one embodiment, the UE may receive the CSI-RS with the same spatial domain receive filter (e.g., the same reception beam).

The UE, in one embodiment, is configured to measure the CSI-RS for the corresponding symbols and to report the CSI information (e.g., L1-RSRP and/or L1-SINR) along with the symbol ID, e.g., CRI-rsrp-symID, so that the BS identifies the best transmit beam direction to be used at the repeater for forwarding DL channels. In another example, the UE may be configured to report CSI information comprising CSI for more than one symbol (e.g., based on higher-layer parameter nrofReportedSym) in a single reporting instance. In such an embodiment, the UE may use differential CSI-based (e.g., L1-RSRP/L1-SINR) reporting relative to the largest value of CSI (e.g., quantized to say 7-bits, differential CSI quantized to 4-bits), the symbol index (e.g. CRI-rsrp-symID) corresponding to each of the reported CSIs may be reported, or a combination of symbol indexes for the largest CSI, and a bitmap (e.g., in case of reporting CSI for fewer symbols than the number of CSI-RS symbols) indicating the symbols for the differential CSI may be reported.

Figure 4:
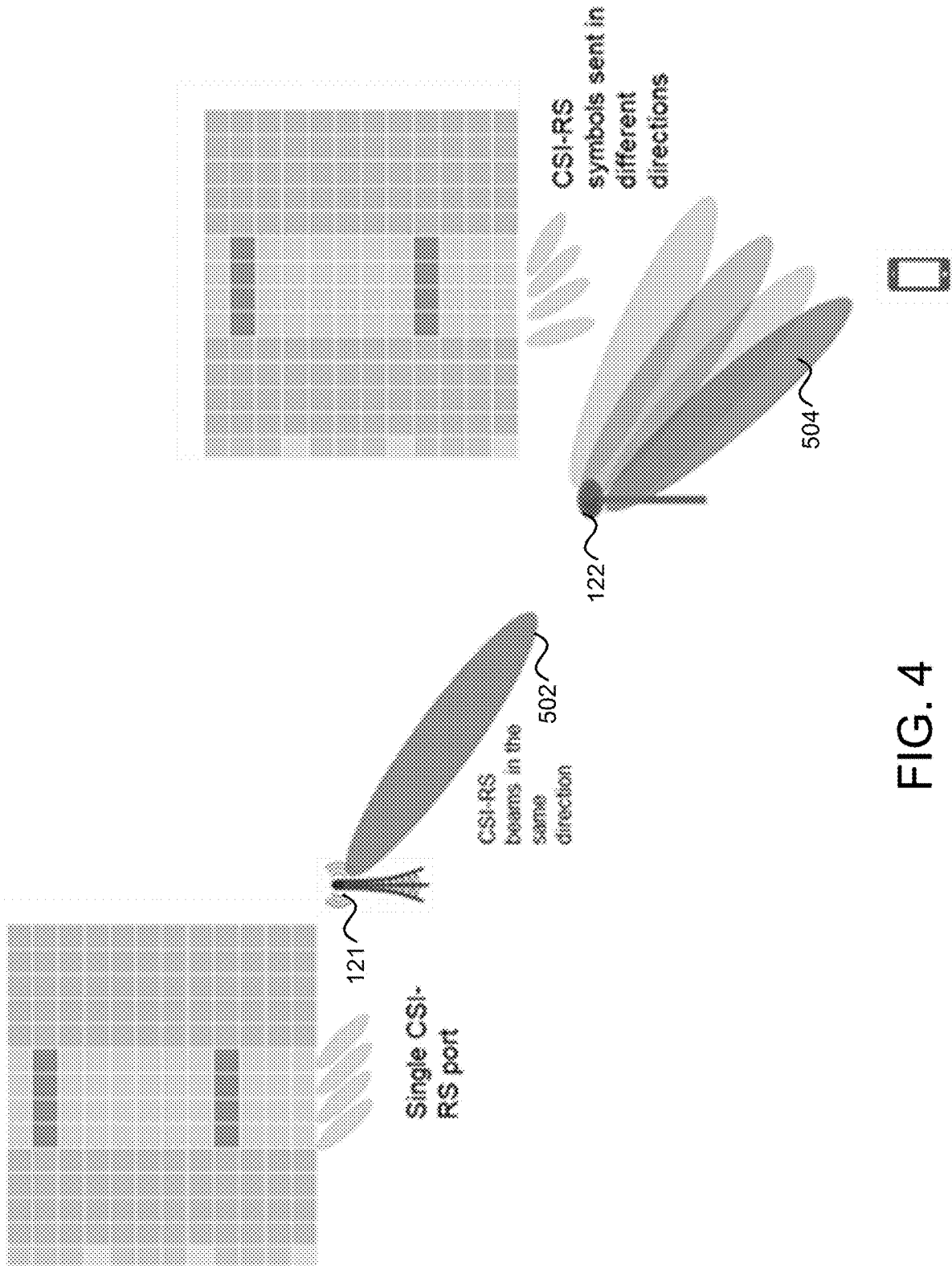
FIG. 4 is a diagram illustrating one example of CSI-RS beam refinement done only at repeater-UE link.

In yet another embodiment, shown in FIG. 4, the repeater 122 is configured, e.g., using control information received at the repeater 122, by the network, e.g., the BS 121, to receive multiple CSI-RS resources using the same spatial filter 502. In such an embodiment, the different CSI-RS resources are transmitted in different symbols, where one CSI-RS resource transmission is separated from another CSI-RS resource transmission with at least x symbols, e.g., x=1,2, 3,4. The repeater, in one embodiment, would then transmit CSI-RS corresponding to different CSI-RS resources using different beams 504. The UE, in one embodiment, would then report the CSI-RS resource indicator ("CRI") (and CSI in one example) corresponding to the best direction or top-N directions corresponding to the highest N CSI values. In one example, the UE may receive the CSI-RS with the same spatial domain receive filter (e.g., the same reception beam).

In one embodiment, the table for indicating the CSI-RS locations within a slot (e.g., Table 7.4.1.5.3-1, 3GPP TS 38.211 V16.6.0) is enhanced to indicate the CSI-RS pattern or the rows within the existing table are restricted/limited to be indicated when UE is communicating via smart repeater. In one implementation, only the rows of the table are allowed where there is not CDM in frequency domain. An illustration is shown below in Table 1, where only the underlined rows can be indicated when smart repeater is used:

TABLE 1

CSI-RS locations within a slot (with restrictions when smart repeater is used)

| Row | Ports X | Density $\rho$ | cdm-Type | $(\bar{k}, \bar{l})$ | CDM group index $j$ | k' | l' |
|---|---|---|---|---|---|---|---|
| 1 | 1 | 3 | noCDM | $(k_0, l_0), (k_0 + 4, l_0), (k_0 + 8, l_0)$ | 0, 0, 0 | 0 | 0 |
| 2 | 1 | 1, 0.5 | noCDM | $(k_0, l_0),$ | 0 | 0 | 0 |
| 3 | 2 | 1, 0.5 | fd-CDM2 | $(k_0, l_0),$ | 0 | 0, 1 | 0 |
| 4 | 4 | 1 | fd-CDM2 | $(k_0, l_0), (k_0 + 2, l_0)$ | 0, 1 | 0, 1 | 0 |
| 5 | 4 | 1 | fd-CDM2 | $(k_0, l_0), (k_0, l_0 + 1)$ | 0, 1 | 0, 1 | 0 |
| 6 | 8 | 1 | fd-CDM2 | $(k_0, l_0), (k_1, l_0), (k_2, l_0), (k_3, l_0)$ | 0, 1, 2, 3 | 0, 1 | 0 |
| 7 | 8 | 1 | fd-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | cdm4-FD2-TD2 | $(k_0, l_0), (k_1, l_0)$ | 0, 1 | 0, 1 | 0, 1 |
| 9 | 12 | 1 | fd-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | cdm4-FD2-TD2 | $(k_0, l_0), (k_1, l_0), (k_2, l_0)$ | 0, 1, 2 | 0, 1 | 0, 1 |
| 11 | 16 | 1, 0.5 | fd-CDM2 | $(k_0, l_0), (k_1, l_0), (k_2, l_0), (k_3, l_0), (k_0, l_0 + 1),$ $(k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | cdm4-FD2-TD2 | $(k_0, l_0), (k_1, l_0), (k_2, l_0), (k_3, l_0)$ | 0, 1, 2, 3 | 0, 1 | 0, 1 |
| 13 | 24 | 1, 0.5 | fd-CDM2 | $(k_0, l_0), (k_1, l_0), (k_2, l_0), (k_0, l_0 + 1), (k_1, l_0 + 1),$ $(k_2, l_0 + 1), (k_0, l_1), (k_1, l_1), (k_2, l_1), (k_0, l_1 + 1),$ $(k_1, l_1 + 1), (k_2, l_1 + 1)$ | 0, 1, 2, 3, 4, 5, 6, 7, 8, 9, 10, 11 | 0, 1 | 0 |

TABLE 1-continued

CSI-RS locations within a slot (with restrictions when smart repeater is used)

| Row | Ports X | Density ρ | cdm-Type | $(\bar{k}, \bar{l})$ | CDM group index $j$ | k' | l' |
|---|---|---|---|---|---|---|---|
| 14 | 24 | 1, 0.5 | cdm4-FD2-TD2 | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | cdm8-FD2-TD4 | $(k_0, l_0), (k_1, l_0), (k_2, l_0)$ | 0, 1, 2 | 0, 1 | 0, 1, 2, 3 |
| 16 | 32 | 1, 0.5 | fd-CDM2 | $(k_0, l_0), (k_1, l_0), (k_2, l_0), (k_3, l_0), (k_0, l_0 + 1),$ $(k_1, l_0 + 1), (k_2, l_0 + 1), (k_3, l_0 + 1), (k_0, l_1),$ $(k_1, l_1), (k_2, l_1), (k_3, l_1), (k_0, l_1 + 1), (k_1, l_1 + 1),$ $(k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | cdm4-FD2-TD2 | $(k_0, l_0), (k_1, l_0), (k_2, l_0), (k_3, l_0), (k_0, l_1), (k_1, l_1),$ $(k_2, l_1), (k_3, l_1)$ | 0, 1, 2, 3, 4, 5, 6, 7 | 0, 1 | 0, 1 |
| 18 | 32 | 1, 0.5 | cdm8-FD2-TD4 | $(k_0, l_0), (k_1, l_0), (k_2, l_0), (k_3, l_0)$ | 0, 1, 2, 3 | 0,1 | 0,1, 2, 3 |

Figure 5A:
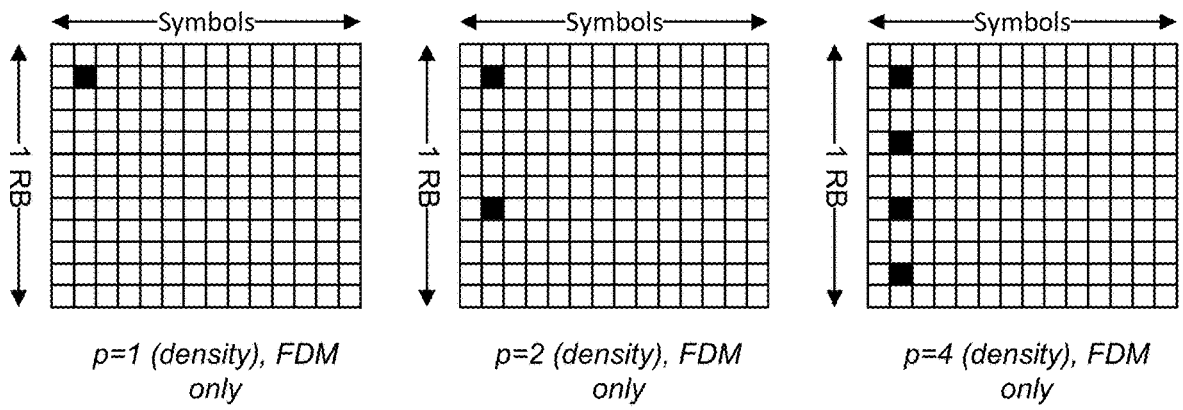
FIG. 5A is a diagram illustrating one example of an FDM only pattern with single port for repeater configuration for channel state information reference signal.
Figure 5B:
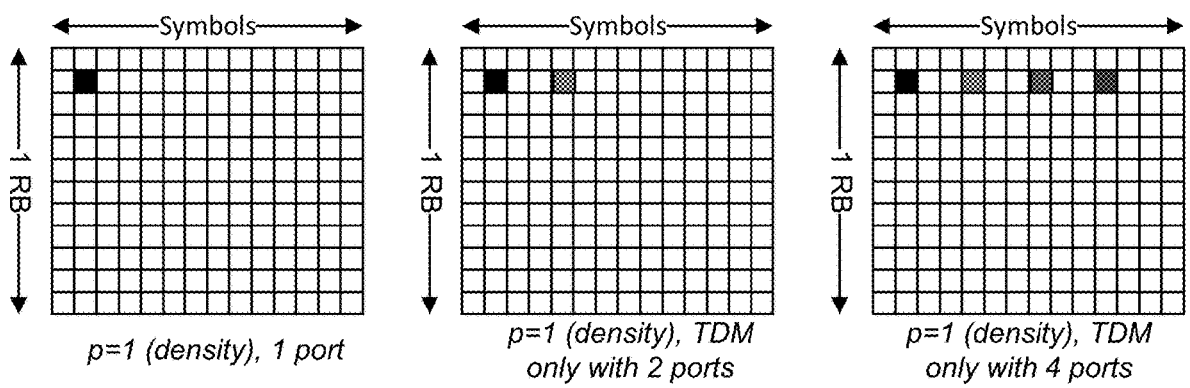
FIG. 5B is a diagram illustrating one example of a TDM only pattern for repeater configuration for channel state information reference signal.
Figure 5C:
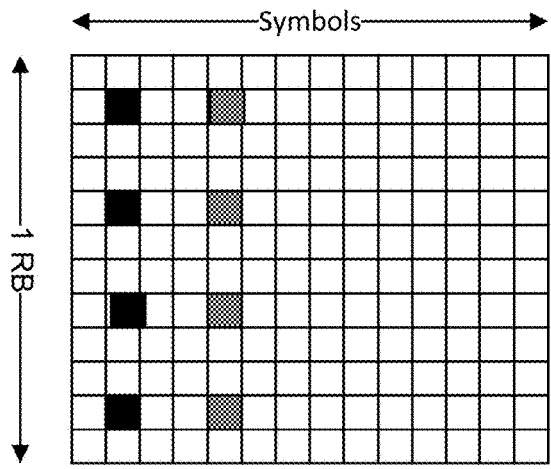
FIG. 5C is a diagram illustrating one example of a combination FDM single port and TDM multi-port pattern for repeater configuration for channel state information reference signal.
Figure 5C:
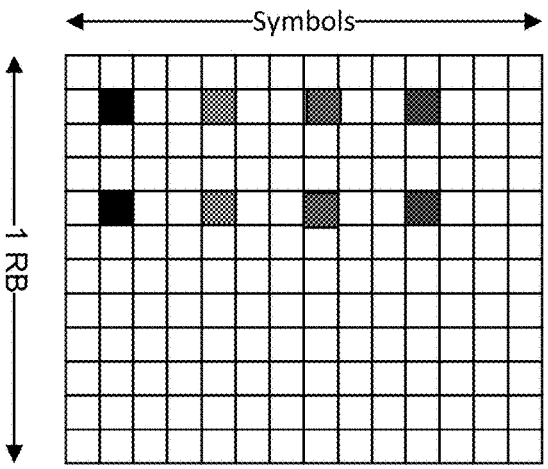
Figure 5D:
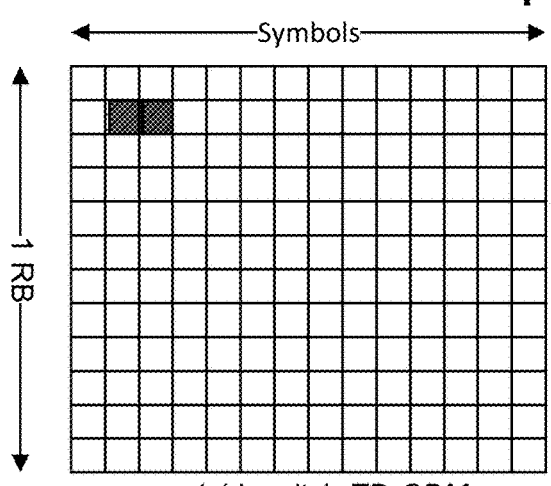
FIG. 5D is a diagram illustrating one example of a TD-CDM pattern for repeater configuration for channel state information reference signal.
Figure 5D:
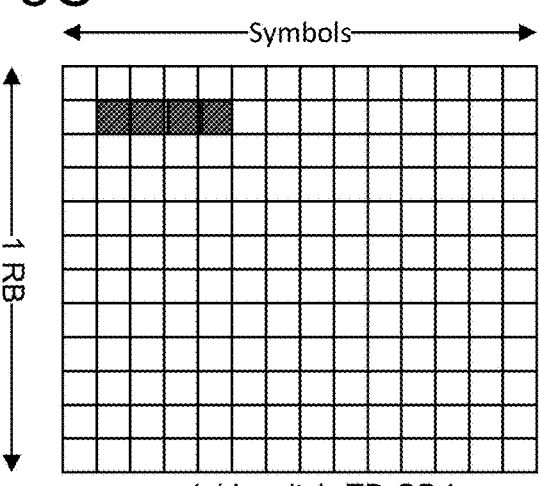
Figure 5E:
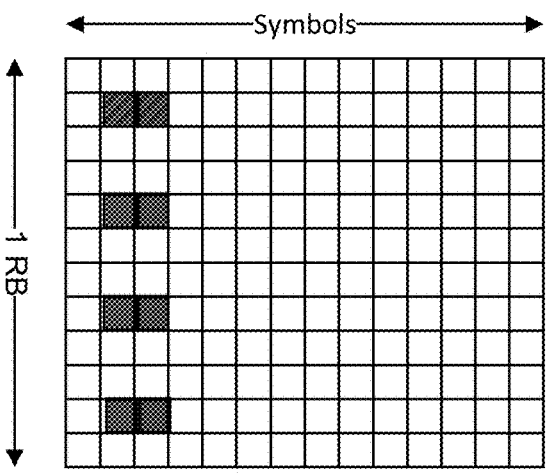
FIG. 5E is a diagram illustrating one example of a combination FDM single port and TD-CDM multi-port pattern for repeater configuration for channel state information reference signal.
Figure 5E:
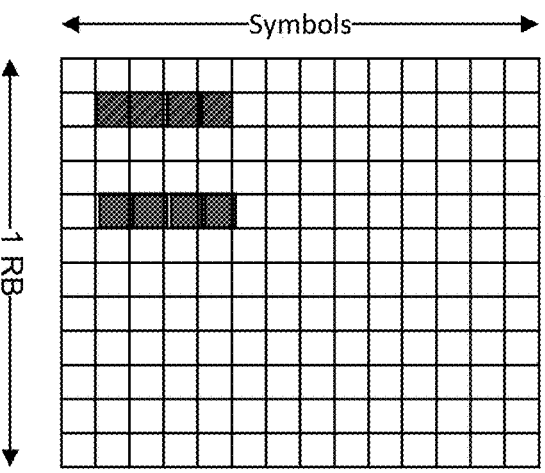

In another implementation, new rows are added to the CSI-RS location table or a new table can be configured, when a smart repeater is used, where patterns are limited to:
- Only FDM (examples illustrated in FIG. 5A, but different patterns are also possible for densities p=1,2,4);
- Only TDM (examples illustrated in FIG. 5B, but different TDM different patterns are also possible);
- FDM+TDM (examples illustrated in FIG. 5C, but different patterns are also possible for densities p=1,2,4 and different TDM patterns);
- TD-CDM (examples illustrated in FIG. 5D, but different patterns are also possible for TD-CDM); and
- FDM+TD-CDM (examples illustrated in FIG. 5E).

In one implementation, more patterns are accommodated by supporting additional values of density such as p=2,4.

In one implementation, the maximum number of CSI-RS ports are limited/restricted (due to absence of FD-CDM) to less than 32 ports, when smart repeater is used.

Figure 6A:
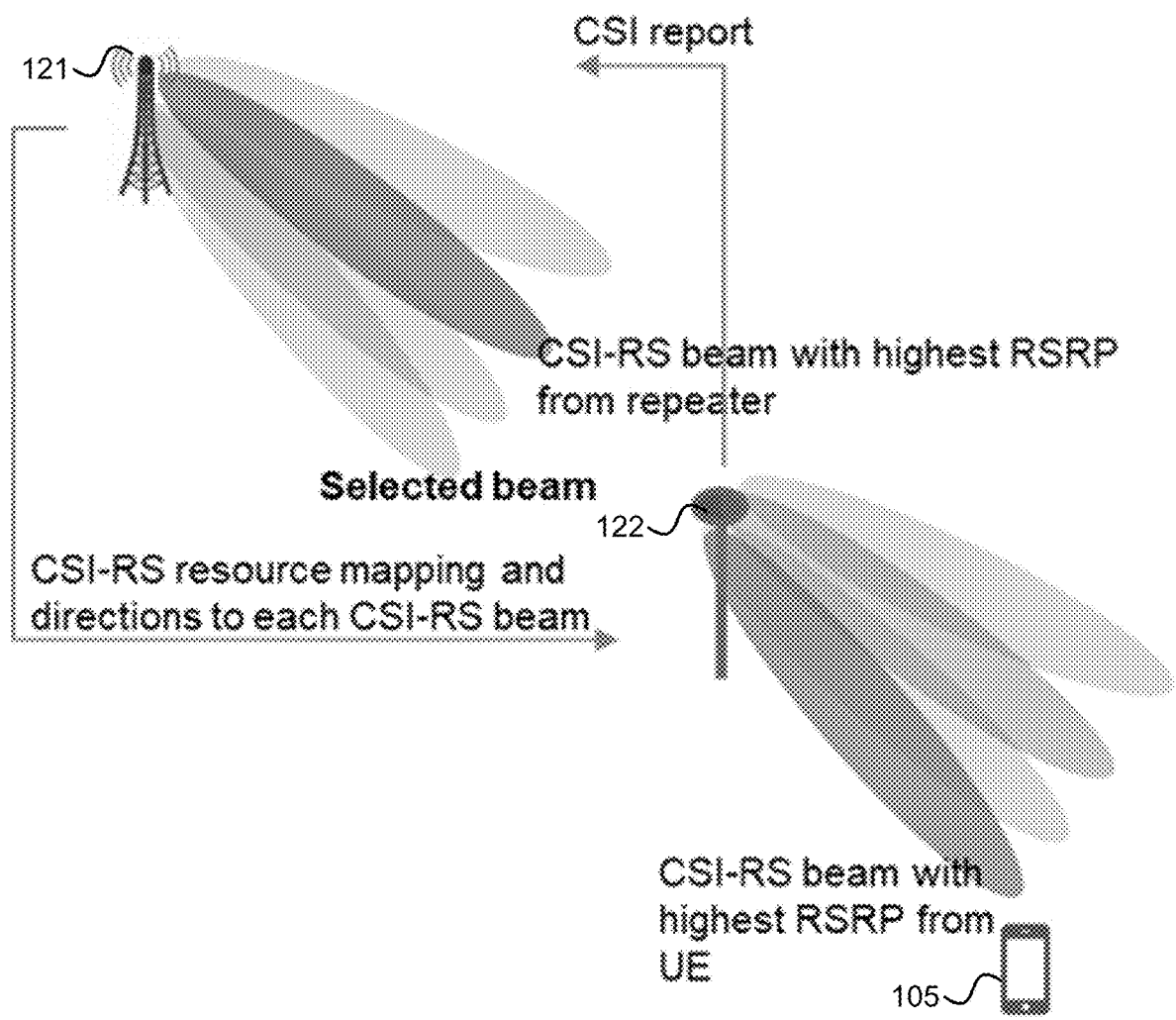
FIG. 6A is a diagram illustrating one example of mapping/association of CSI-RS beam of BS-repeater link to CSI-RS beam of repeater-UE link.
Figure 6B:
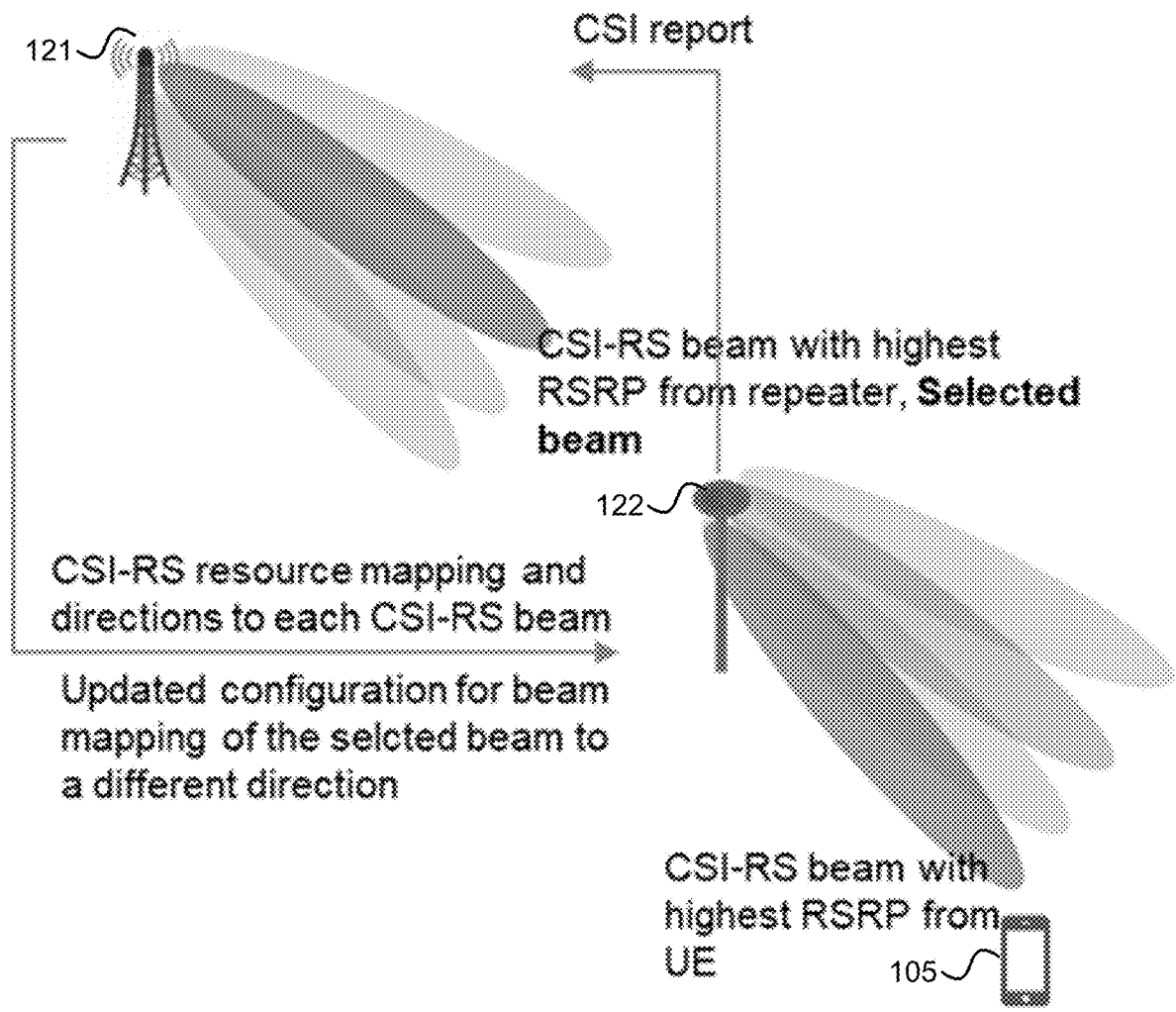
FIG. 6B is a diagram illustrating one example of mapping/association of CSI-RS beam of BS-repeater link to CSI-RS beam of repeater-UE link.

In one embodiment directed to a repeater with measurement (baseband) capability, shown in FIGS. 6A and 6B, a smart repeater(s) with a baseband for CSI-RS measurement is configured by the network with a CSI-RS resource set configuration and an indication for reporting CSI measurements for beam refinement between BS and repeater. The repeater, in one embodiment, measures the CSI-RS from the BS based on the configured CSI-RS resource set and reports CSI measurements that include CRI-RSRP, CRI-SINR, and/or the like, for each configured CSI-RS (or report the largest CSI measurement or a subset of CSI measurements). Upon receiving the report, in one embodiment, the BS may select the beam that is associated with the best measured CSI-RS for DL data transmission to the repeater.

Based upon predefined thresholds of the measured CSI-RS from the repeater and from the UE, in one embodiment, the BS may decide to select the beam with the highest CRI-RSRP/CRI-SINR (or a suitable beam, e.g., a beam with CSI above a threshold) reported from the UE (e.g., measured on the beam amplified and forwarded by the repeater) and use it also for the link between the BS and the smart repeater if the beam with the highest RSRP (or the suitable beam) reported from the UE is the same as that reported by the smart repeater, or if the beam with highest RSRP (or the suitable beam) reported by the UE satisfies the predefined threshold.

In one embodiment, if the beam with the highest RSRP (or the suitable beam) reported from the UE is different than the one reported by the repeater and the beam with highest RSRP (or the suitable beam) reported by the UE doesn't satisfy a predefined threshold, then the BS selects the beam with the highest RSRP (or a suitable beam above an RSRP threshold) reported by the repeater for the link between the repeater and BS and configures the repeater to use the beam direction/spatial filter associated with the highest RSRP beam (or a suitable beam above an RSRP threshold) reported by the UE for the next CSI-RS period.

In another embodiment, the network or BS shares an UL RS configuration with the repeater, e.g., SRS transmission configuration in time and frequency. The repeater then uses the same transmit beam for signal forwarding to the UE as the receive beam used for signal reception from the UE in prior slot(s) (e.g., assuming beam correspondence).

In one embodiment directed to CSI-RS repeater selection, the BS configures the UE with repeater-specific reference signals to report the best repeater that may be used to serve the UE or CRI corresponding to the best repeater or CSI-RS resources received with highest RSRP/SINR or above a threshold. The BS may associate a CSI-RS resource with a particular repeater. Due to UE mobility, it may happen that the UE is no longer in the coverage of the repeater that forwarded the SSB/CSI-RS beam for that UE for connection. The BS, in one embodiment, configures multiple repeaters to forward repeater specific reference signals to UEs. In one implementation, the BS assigns SSB/CSI-RS beams to different repeaters and configures the repeaters with time and directional information to forward the SSB/CSI-RS. The UE, in one embodiment, measures the CSI-RS received from multiple repeaters and reports the CRI-RSRP/CRI-SINR/SSB-INDEX-RSRP/SSB-INDEX-SINR to the BS. Based on a predefined threshold and based on the SSB/CSI-RS with the highest RSRP (or a suitable beam above a RSRP threshold), in one embodiment, the BS assigns the repeater associated with the SSB/CSI-RS beam with the highest RSRP (or the suitable beam) to serve the reporting UE. Based on the reported RSRP, in one embodiment, the network may switch on, turn on, activate, or the like the repeater associated with the highest RSRP (or RSRP/SINR above a threshold) and switch off, turn off, deactivate, or the like, the other repeaters e.g., associated with a lower RSRP.

In one embodiment, the network may configure the UE with a set of reference signals, such as CSI-RS, where one subset of CSI-RS ports is associated with one smart repeater and another subset of CSI-RS ports are associated with another smart repeater. In one implementation, the UE can be configured/pre-configured with the association of smart repeaters and corresponding CSI-RS ports.

In one implementation, when the CSI-RS ports with CDM in the frequency domain needs to be applied to a smart repeater, then one smart repeater can be associated with ports on a given symbol with CDM1 (e.g., first CDM code or orthogonal code), while another smart repeater can be associated with ports on the same symbol on same REs, but with a different CDM2 (e.g., second CDM code or orthogonal code). This may effectively allow the same CSI-RS patterns from a gNB and UE perspective. Basically, in one embodiment, the same number of CSI-RS ports, such as the maximum 32 ports, can be maintained, but each smart repeater is associated with only a subset. For example, when two smart repeaters are used, then 16 ports can be associated with the first smart repeater and another 16 ports can be associated with the second smart repeater.

In another implementation, the BS configures repeater RS different than the CSI-RS. The RS may be scrambled with the repeater ID (e.g., repeater ID or an ID corresponding to a repeater used in the initialization of the pseudo-random sequence generator associated with the CSI-RS sequence) and mapped to repeater specific resources. The UE, in one embodiment, is configured with the BS with the resources of these RS and indicated to measure and report the RSRP/SINR of the configured RS resources. The BS may assign the corresponding repeater with the highest RSRP (or RSRP/SINR above a threshold) RS reported from the UE.

In one implementation, the BS configures the UE to report the quality of all or a subset of configured links (e.g., CSI-RS beams/repeater-specific RS). In another implementation, the UE is configured to report only the links with qualities that satisfy a predefined threshold.

Figure 7:
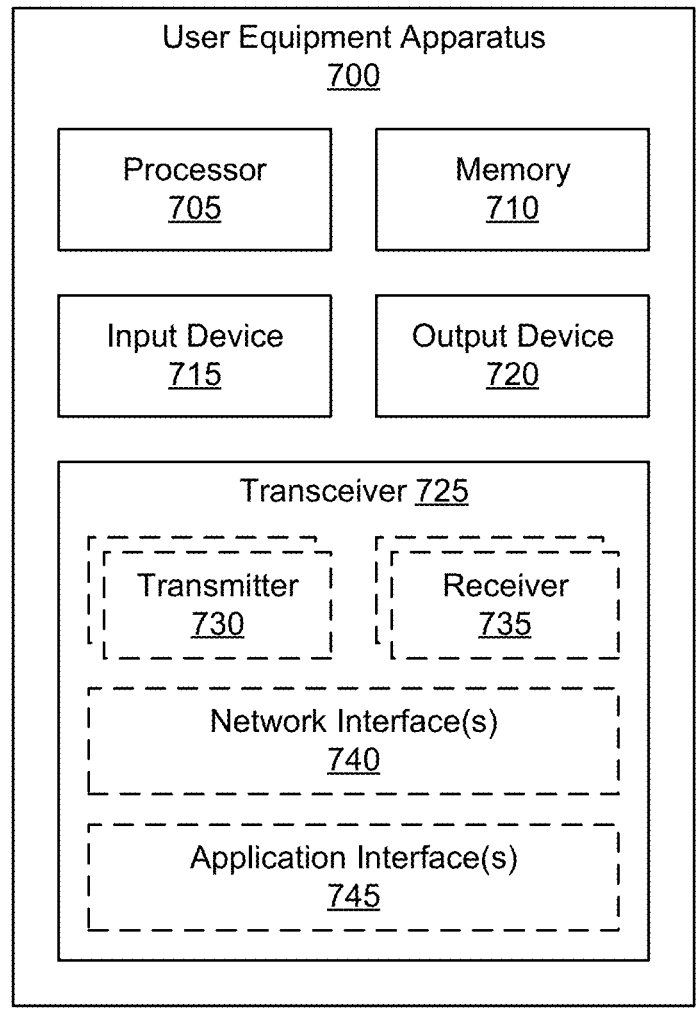
FIG. 7 is a block diagram illustrating one embodiment of a user equipment apparatus that may be used for repeater configuration for channel state information reference signal.

FIG. 7 depicts a user equipment apparatus 700 that may be used for repeater configuration for channel state information reference signal, according to embodiments of the disclosure. In various embodiments, the user equipment apparatus 700 is used to implement one or more of the solutions described above. The user equipment apparatus 700 may be one embodiment of the remote unit 105 and/or the UE, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panel supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio functions.

In various embodiments, the processor 705 and transceiver 725 control the user equipment apparatus 700 to implement the above described UE behaviors. In one embodiment, the transceiver 725 receives, from a base station of a mobile wireless communication network, an indication to report repeater-specific reference signal ("RS") measurements associated with a repeater node and repeater-specific channel state information RS ("CSI-RS") and transmits, to the base station, repeater-specific RS measurements associated with the received repeater-specific CSI-RS.

In one embodiment, the transceiver 725 receives a configuration from the base station for reporting at least one of CSI-RS resource indicator ("CRI") reference signal received power and CRI signal-to-noise and interference ratio associated with a symbol identifier for the base station to identify a beam to be used at the repeater node.

In one embodiment, the transceiver 725 receives a configuration to report a quality of at least one configured link. In one embodiment, the transceiver 725 receives a configuration to report a quality of at least one configured link in response to the quality of the at least one configured link satisfying a predefined quality threshold.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to repeater configuration for channel state information reference signal. For example, the memory 710 may store various parameters, panel/beam configurations, resource assignments, policies, and the like as described above. In certain embodiments, the memory 710 also stores program code and related data, such as an operating system or other controller algorithms operating on the user equipment apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
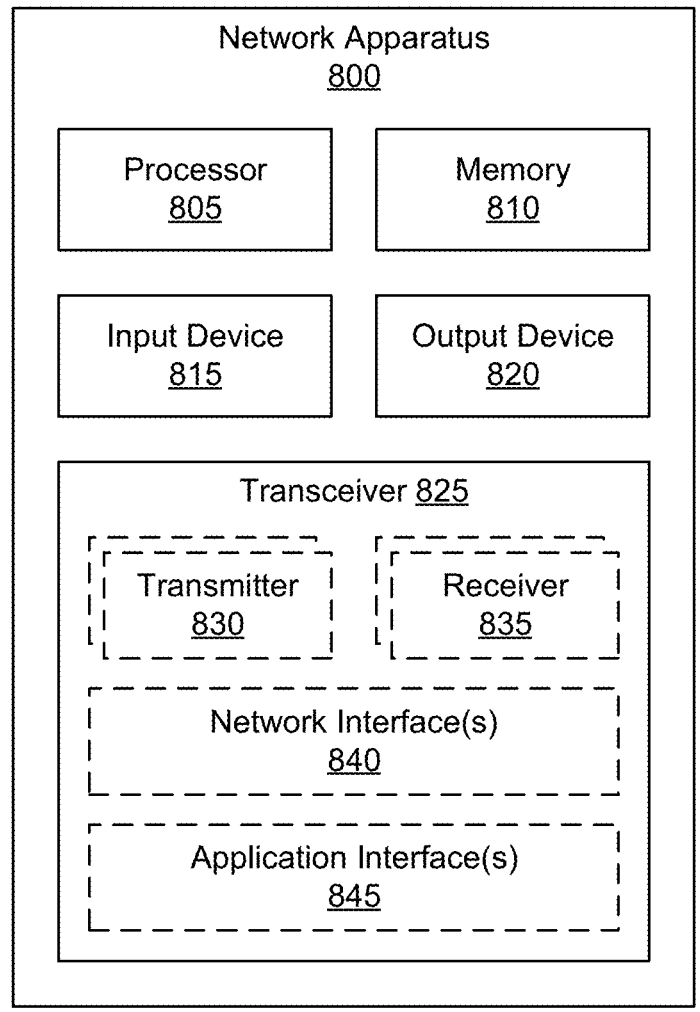
FIG. 8 is a block diagram illustrating one embodiment of a network apparatus that may be used for repeater configuration for channel state information reference signal.

FIG. 8 depicts a network apparatus 800 that may be used for repeater configuration for channel state information reference signal, according to embodiments of the disclosure. In one embodiment, network apparatus 800 may be one implementation of a RAN node, such as the base unit 121, the RAN node 210, or gNB, described above. Furthermore, the base network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and operating system ("OS") functions and a baseband processor (also known as "baseband radio processor") which manages radio function.

In various embodiments, the network apparatus 800 is a RAN node (e.g., gNB) that includes a processor 805 and a transceiver 825. In one embodiment, the transceiver 825 transmits an initial setup configuration to a repeater node for establishing a forwarding link with a user equipment ("UE") device, transmits an initial access configuration to the repeater node, the initial access configuration comprising one or more configuration parameters that allow the UE to establish access to a mobile wireless communication network via the repeater node, and receives feedback from the repeater node that indicates reception of one or more of the initial setup configuration and the initial access configuration.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to repeater configuration for channel state information reference signal. For example, the memory 810 may store parameters, configurations, resource assignments, policies, and the like, as described above. In certain embodiments, the memory 810 also stores program code and related data, such as an operating system or other controller algorithms operating on the network apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all, or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the non-public network ("NPN"), PLMN and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

In one embodiment, the transceiver 825 receives a first configuration from a base station of a mobile wireless communication network, the first configuration comprising channel state information reference signal ("CSI-RS") configuration information for amplifying and forwarding CSI-RS beams to a user equipment ("UE") device from the repeater node.

In one embodiment, the transceiver 825 receives a second configuration from the base station, the second configuration comprising configuration information for performing measurement and reporting of the CSI-RS beams. In one embodiment, the transceiver 825 receives repeater-specific CSI-RS to be forwarded to the UE device and transmits the repeater-specific CSI-RS to the UE device according to the first configuration.

In one embodiment, the first configuration further comprises receiving time information of a location of slots with CSI-RS and beam information for each CSI-RS symbol. In one embodiment, the beam information comprises an association of one or more antenna ports at the base station with one or more antenna ports at the repeater for each symbol such that one or more CSI-RS received from the base station are grouped for one symbol and associated with one antenna port at the repeater.

In one embodiment, in response to identifying that the UE device is connected to the base station through the repeater node, the first configuration is limited to a time domain and the repeater node is configured with time and beam information such that CSI-RS resource elements ("REs") for different ports are mapped to different orthogonal frequency-division multiplexing ("OFDM") symbols.

In one embodiment, the transceiver 825 receives an indication from the base station to apply beam refinement on a single CSI-RS port beam, wherein a different beam configuration is applied for each of multiple symbols that are received on the single CSI-RS port beam from the base station.

In one embodiment, the transceiver 825 receives different CSI-RS resources from the base station using a same spatial filter, the different CSI-RS resources receiving in different symbols, and transmits CSI-RS corresponding to the different CSI-RS resources using different beams.

In one embodiment, the transceiver 825 receives, from the base station, a CSI-RS resource set configuration and an indication for reporting CSI measurements for beam refinement for a link between the base station and the repeater node.

In one embodiment, the transceiver 825 receives an uplink ("UL") RS configuration from the base station for transmitting and receiving, on a same beam, signals from the UE device in a prior slot.

In one embodiment, the transceiver 825 transmits a first configuration to a repeater node of a mobile wireless communication network, the first configuration comprising channel state information reference signal ("CSI-RS") configuration information for amplifying and forwarding CSI-RS beams to a user equipment ("UE") device from the repeater node.

In one embodiment, the transceiver 825 transmits a second configuration to the repeater node, the second configuration comprising configuration information for performing measurement and reporting of the CSI-RS beams. In one embodiment, the transceiver 825 transmits repeater-specific CSI-RS to the repeater node to be forwarded to the UE device and transmits an indication to the UE device to report repeater-specific CSI-RS measurements to the base station.

In one embodiment, the first configuration further comprises receiving time information of a location of slots with CSI-RS and beam information for each CSI-RS symbol. In one embodiment, the beam information comprises an association of one or more antenna ports at the base station with one or more antenna ports at the repeater for each symbol such that one or more CSI-RS received from the base station are grouped for one symbol and associated with one antenna port at the repeater.

In one embodiment, the second apparatus includes a processor that, in response to identifying that the UE device is connected to the base station through the repeater node, limits the first configuration to a time domain and configures the repeater node with time and beam information such that CSI-RS resource elements ("REs") for different ports are mapped to different orthogonal frequency-division multiplexing ("OFDM") symbols.

In one embodiment, the transceiver 825 transmits an indication to the repeater node to apply beam refinement on a single CSI-RS port beam, wherein a different beam configuration is applied for each of multiple symbols that are received on the single CSI-RS port beam from the base station.

In one embodiment, the processor 805 configures the UE device to report at least one of CSI-RS resource indicator ("CRI") reference signal received power and CRI signal-to-noise and interference ratio associated with a symbol identifier for the base station to identify a beam to be used at the repeater node.

In one embodiment, the processor 805 configures the repeater node to receive different CSI-RS resources using a same spatial filter, wherein the different CSI-RS resources are transmitted in different symbols using different beams.

In one embodiment, the processor 805 configures the repeater node with a CSI-RS resource set configuration and an indication for reporting CSI measurements for beam refinement for a link between the base station and the repeater node, compares CSI measurements reported from the repeater node and the UE device, and at least one of selects a beam for each link between the base station, the UE, and the repeater node, and associates beams of links between the base station, the UE, and the repeater node.

In one embodiment, the transceiver 825 transmits to the repeater node an uplink ("UL") RS configuration from the base station for transmitting and receiving, on a same beam, signals from the UE device in a prior slot. In one embodiment, the transceiver 825 configures different repeaters to forward repeater-specific RS to the UE device.

In one embodiment, the processor 805 assigns CSI-RS beams to the different repeaters and configuring the different repeaters with time and directional information to forward the CSI-RS to the UE device. In one embodiment, the processor 805 associates one of the different repeaters with ports on a given symbol with one code division multiplexing ("CDM") and associating another one of the different repeaters with ports on a same symbol but with a different CDM in response to determining that the CSI-RS ports with CDM in a frequency domain should be applied.

In one embodiment, the processor 805 configures the UE device to report measurements of repeater-specific RS to the base station ad selects a repeater of the different repeaters that can serve the UE device for data transmission.

In one embodiment, the processor 805 configures the UE device to report a quality of at least one configured link between the UE and a repeater node. In one embodiment, the processor 805 configures the UE device to report a quality of at least one configured link in response to the quality of the at least one configured link satisfying a predefined quality threshold.

Figure 9:
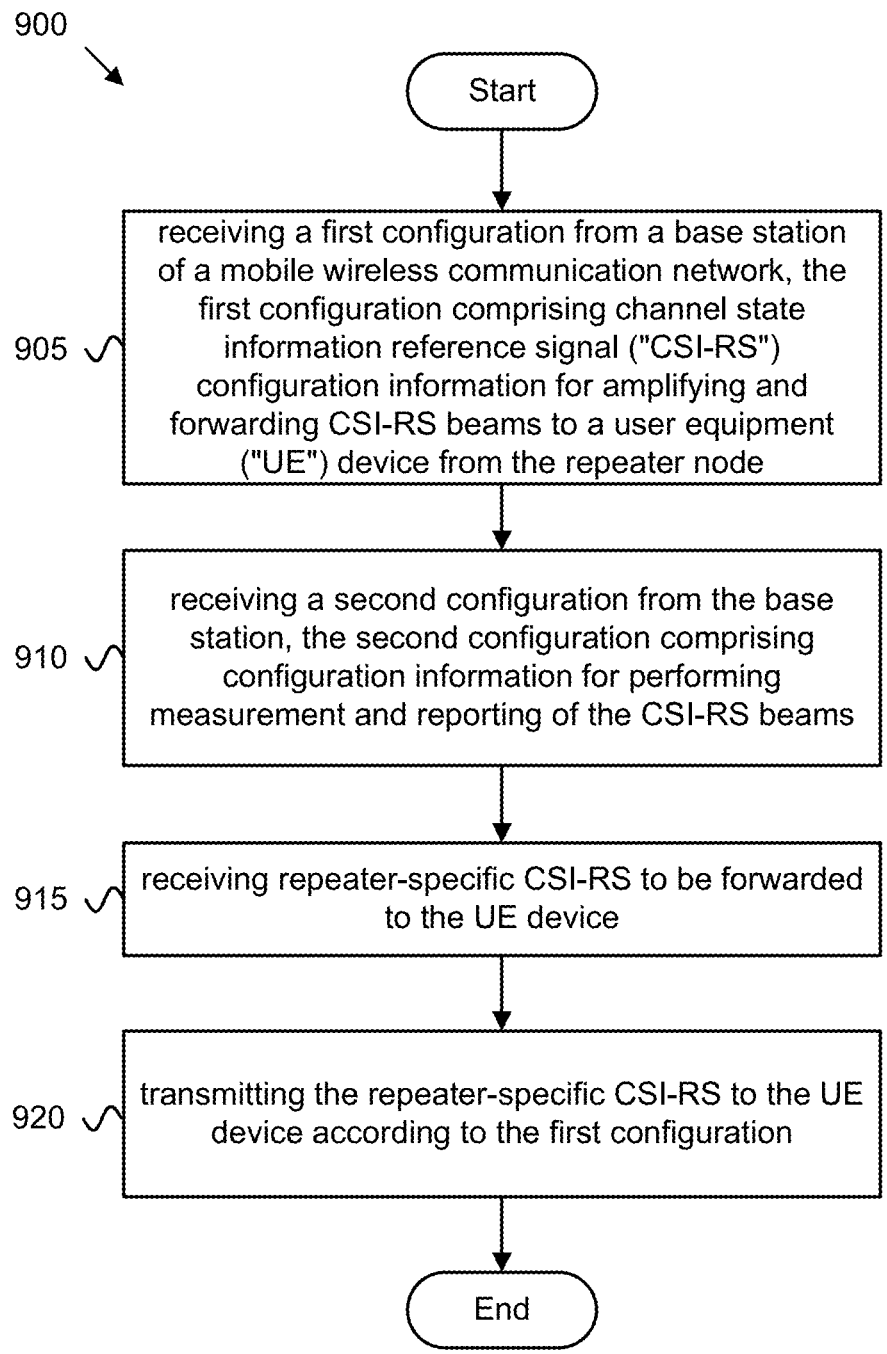
FIG. 9 is a flowchart diagram illustrating one embodiment of a method for repeater configuration for channel state information reference signal.

FIG. 9 is a flowchart diagram of a method 900 for repeater configuration for channel state information reference signal. The method 900 may be performed by a repeater node such as a network equipment apparatus 800. In some embodiments, the method 900 may be performed by a processor executing program code, for example, a microcontroller, a microprocessor, a CPU, a GPU, an auxiliary processing unit, a FPGA, or the like.

In one embodiment, the method 900 includes receiving 905 a first configuration from a base station of a mobile wireless communication network, the first configuration comprising channel state information reference signal ("CSI-RS") configuration information for amplifying and forwarding CSI-RS beams to a user equipment ("UE") device from the repeater node. In one embodiment, the method 900 includes receiving 910 a second configuration from the base station, the second configuration comprising configuration information for performing measurement and reporting of the CSI-RS beams.

In one embodiment, the method 900 includes receiving 915 repeater-specific CSI-RS to be forwarded to the UE device. In one embodiment, the method 900 includes transmitting 920 the repeater-specific CSI-RS to the UE device according to the first configuration, and the method 900 ends.

Figure 10:
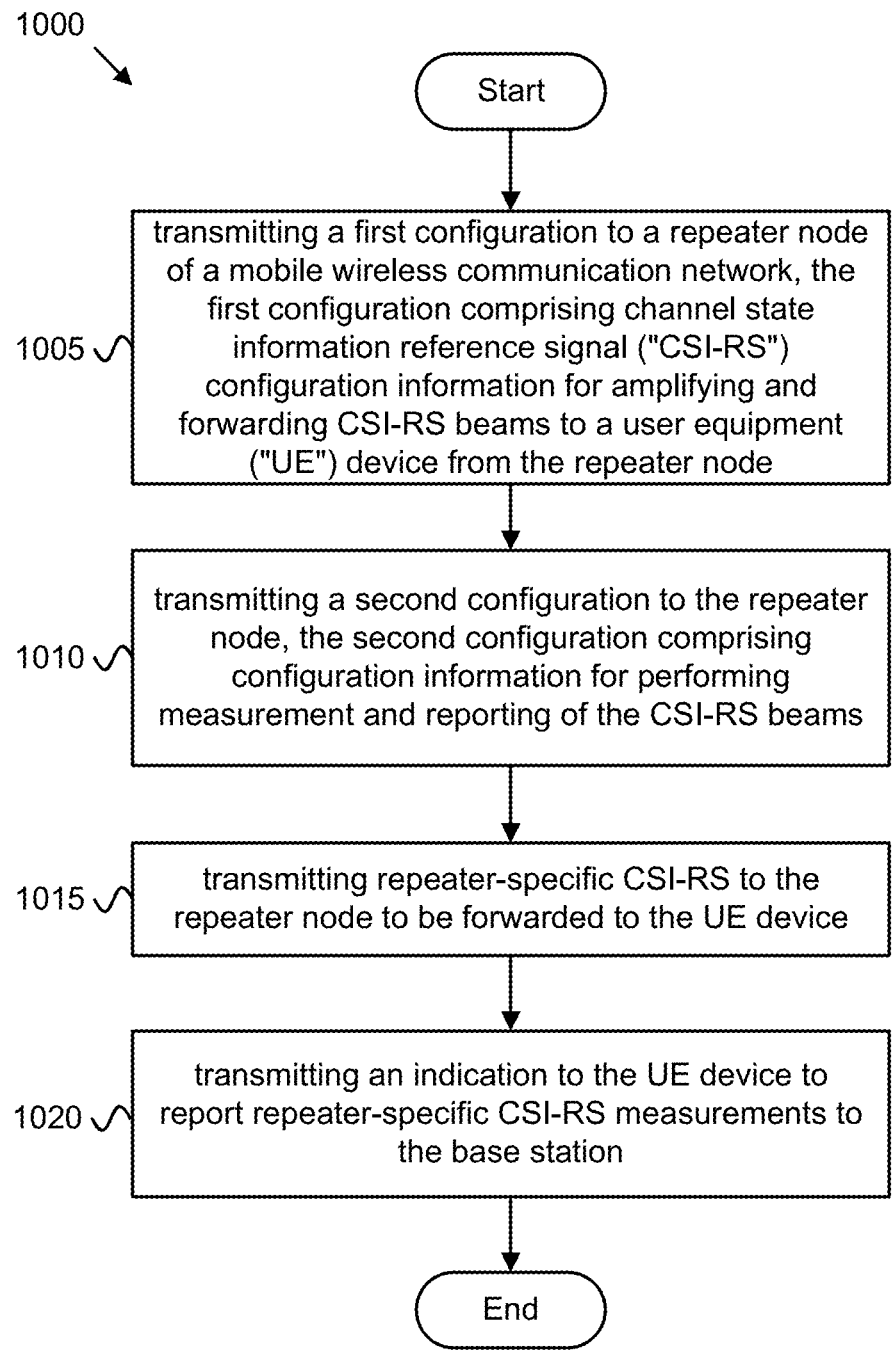
FIG. 10 is a flowchart diagram illustrating one embodiment of another method for repeater configuration for channel state information reference signal.

FIG. 10 is a flowchart diagram of a method 1000 for repeater configuration for channel state information reference signal. The method 1000 may be performed by a network entity such as a base node, a gNB, and/or the network equipment apparatus 800. In some embodiments, the method 1000 may be performed by a processor executing program code, for example, a microcontroller, a microprocessor, a CPU, a GPU, an auxiliary processing unit, a FPGA, or the like.

In one embodiment, the method 1000 includes transmitting 1005 a first configuration to a repeater node of a mobile wireless communication network, the first configuration comprising channel state information reference signal ("CSI-RS") configuration information for amplifying and forwarding CSI-RS beams to a user equipment ("UE") device from the repeater node. In one embodiment, the method 1000 includes transmitting 1010 a second configuration to the repeater node, the second configuration comprising configuration information for performing measurement and reporting of the CSI-RS beams.

In one embodiment, the method 1000 includes transmitting 1015 repeater-specific CSI-RS to the repeater node to be forwarded to the UE device. In one embodiment, the method 1000 includes transmitting 1020 an indication to the UE device to report repeater-specific CSI-RS measurements to the base station, and the method 1000 ends.

Figure 11:
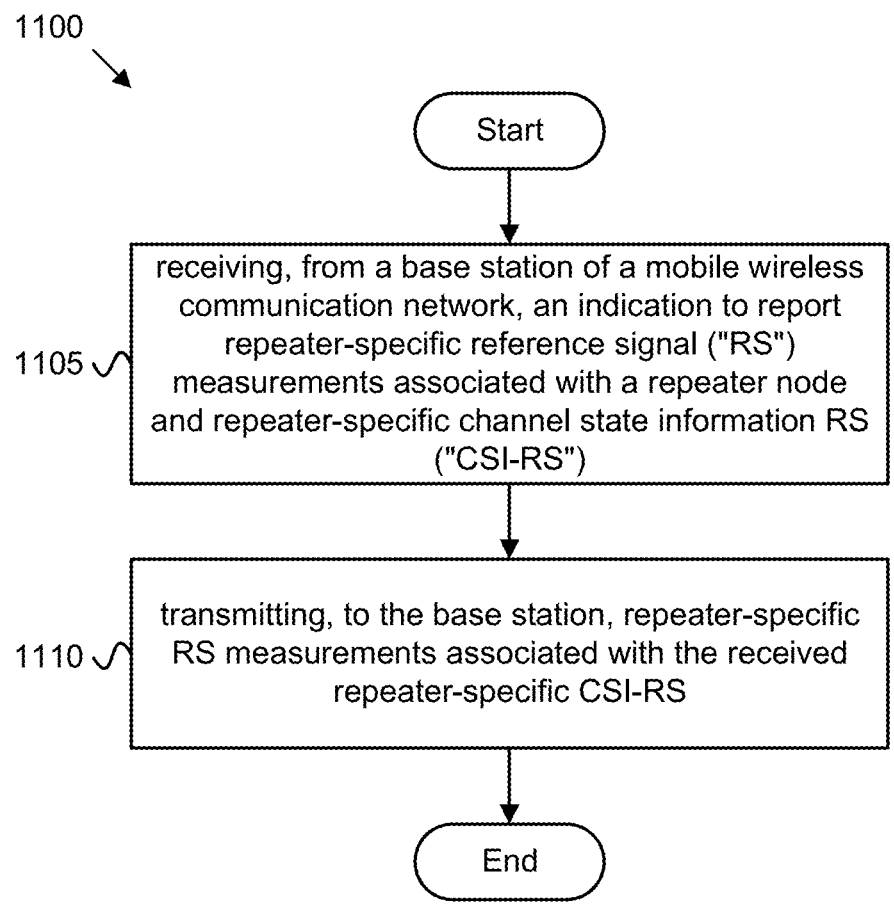
FIG. 11 is a flowchart diagram illustrating one embodiment of another method for repeater configuration for channel state information reference signal.

FIG. 11 is a flowchart diagram of a method 1100 for repeater configuration for channel state information reference signal. The method 1100 may be performed by a user equipment apparatus 700 such as remote unit 105. In some embodiments, the method 1100 may be performed by a processor executing program code, for example, a microcontroller, a microprocessor, a CPU, a GPU, an auxiliary processing unit, a FPGA, or the like.

In one embodiment, the method 1100 includes receiving 1105, from a base station of a mobile wireless communication network, an indication to report repeater-specific reference signal ("RS") measurements associated with a repeater node and repeater-specific channel state information RS ("CSI-RS"). In one embodiment, the method 1100 includes transmitting 1110, to the base station, repeater-specific RS measurements associated with the received repeater-specific CSI-RS, and the method 1100 ends.

A first apparatus is disclosed for repeater configuration for channel state information reference signal. The first apparatus may include a repeater node such as a network equipment apparatus 800. In some embodiments, the first apparatus includes a processor executing program code, for example, a microcontroller, a microprocessor, a CPU, a GPU, an auxiliary processing unit, a FPGA, or the like.

In one embodiment, the first apparatus includes a transceiver that receives a first configuration from a base station of a mobile wireless communication network, the first configuration comprising channel state information reference signal ("CSI-RS") configuration information for amplifying and forwarding CSI-RS beams to a user equipment ("UE") device from the repeater node.

In one embodiment, the transceiver receives a second configuration from the base station, the second configuration comprising configuration information for performing measurement and reporting of the CSI-RS beams. In one embodiment, the transceiver receives repeater-specific CSI-RS to be forwarded to the UE device and transmits the repeater-specific CSI-RS to the UE device according to the first configuration.

In one embodiment, the first configuration further comprises receiving time information of a location of slots with CSI-RS and beam information for each CSI-RS symbol. In one embodiment, the beam information comprises an association of one or more antenna ports at the base station with one or more antenna ports at the repeater for each symbol such that one or more CSI-RS received from the base station are grouped for one symbol and associated with one antenna port at the repeater.

In one embodiment, in response to identifying that the UE device is connected to the base station through the repeater node, the first configuration is limited to a time domain and the repeater node is configured with time and beam information such that CSI-RS resource elements ("REs") for different ports are mapped to different orthogonal frequency-division multiplexing ("OFDM") symbols.

In one embodiment, the transceiver receives an indication from the base station to apply beam refinement on a single CSI-RS port beam, wherein a different beam configuration is applied for each of multiple symbols that are received on the single CSI-RS port beam from the base station.

In one embodiment, the transceiver receives different CSI-RS resources from the base station using a same spatial filter, the different CSI-RS resources receiving in different symbols, and transmits CSI-RS corresponding to the different CSI-RS resources using different beams.

In one embodiment, the transceiver receives, from the base station, a CSI-RS resource set configuration and an indication for reporting CSI measurements for beam refinement for a link between the base station and the repeater node.

In one embodiment, the transceiver receives an uplink ("UL") RS configuration from the base station for transmitting and receiving, on a same beam, signals from the UE device in a prior slot.

A first method is disclosed for repeater configuration for channel state information reference signal. The first method may be performed by a repeater node such as a network equipment apparatus 800. In some embodiments, the first method may be performed by a processor executing program code, for example, a microcontroller, a microprocessor, a CPU, a GPU, an auxiliary processing unit, a FPGA, or the like.

In one embodiment, the first method includes receiving a first configuration from a base station of a mobile wireless communication network, the first configuration comprising channel state information reference signal ("CSI-RS") configuration information for amplifying and forwarding CSI-RS beams to a user equipment ("UE") device from the repeater node.

In one embodiment, the first method includes receiving a second configuration from the base station, the second configuration comprising configuration information for performing measurement and reporting of the CSI-RS beams. In one embodiment, the first method includes receiving repeater-specific CSI-RS to be forwarded to the UE device and transmits the repeater-specific CSI-RS to the UE device according to the first configuration.

In one embodiment, the first configuration further comprises receiving time information of a location of slots with CSI-RS and beam information for each CSI-RS symbol. In one embodiment, the beam information comprises an association of one or more antenna ports at the base station with one or more antenna ports at the repeater for each symbol such that one or more CSI-RS received from the base station are grouped for one symbol and associated with one antenna port at the repeater.

In one embodiment, in response to identifying that the UE device is connected to the base station through the repeater node, the first method includes limiting the first configuration to a time domain and the repeater node is configured with time and beam information such that CSI-RS resource elements ("REs") for different ports are mapped to different orthogonal frequency-division multiplexing ("OFDM") symbols.

In one embodiment, the first method includes receiving an indication from the base station to apply beam refinement on a single CSI-RS port beam, wherein a different beam configuration is applied for each of multiple symbols that are received on the single CSI-RS port beam from the base station.

In one embodiment, the first method includes receiving different CSI-RS resources from the base station using a same spatial filter, the different CSI-RS resources receiving in different symbols, and transmitting CSI-RS corresponding to the different CSI-RS resources using different beams.

In one embodiment, the first method includes receiving, from the base station, a CSI-RS resource set configuration and an indication for reporting CSI measurements for beam refinement for a link between the base station and the repeater node.

In one embodiment, the first method includes receiving an uplink ("UL") RS configuration from the base station for transmitting and receiving, on a same beam, signals from the UE device in a prior slot.

A second apparatus is disclosed for repeater configuration for channel state information reference signal. The second apparatus may include a network entity such as a base node, a gNB, and/or the network equipment apparatus 800. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver that transmits a first configuration to a repeater node of a mobile wireless communication network, the first configuration comprising channel state information reference signal ("CSI-RS") configuration information for amplifying and forwarding CSI-RS beams to a user equipment ("UE") device from the repeater node.

In one embodiment, the transceiver transmits a second configuration to the repeater node, the second configuration comprising configuration information for performing measurement and reporting of the CSI-RS beams. In one embodiment, the transceiver transmits repeater-specific CSI-RS to the repeater node to be forwarded to the UE device and transmits an indication to the UE device to report repeater-specific CSI-RS measurements to the base station.

In one embodiment, the first configuration further comprises receiving time information of a location of slots with CSI-RS and beam information for each CSI-RS symbol. In one embodiment, the beam information comprises an association of one or more antenna ports at the base station with one or more antenna ports at the repeater for each symbol such that one or more CSI-RS received from the base station are grouped for one symbol and associated with one antenna port at the repeater.

In one embodiment, the second apparatus includes a processor that, in response to identifying that the UE device is connected to the base station through the repeater node, limits the first configuration to a time domain and configures the repeater node with time and beam information such that CSI-RS resource elements ("REs") for different ports are mapped to different orthogonal frequency-division multiplexing ("OFDM") symbols.

In one embodiment, the transceiver transmits an indication to the repeater node to apply beam refinement on a single CSI-RS port beam, wherein a different beam configuration is applied for each of multiple symbols that are received on the single CSI-RS port beam from the base station.

In one embodiment, the processor configures the UE device to report at least one of CSI-RS resource indicator ("CRI") reference signal received power and CRI signal-to-noise and interference ratio associated with a symbol identifier for the base station to identify a beam to be used at the repeater node.

In one embodiment, the processor configures the repeater node to receive different CSI-RS resources using a same spatial filter, wherein the different CSI-RS resources are transmitted in different symbols using different beams.

In one embodiment, the processor configures the repeater node with a CSI-RS resource set configuration and an indication for reporting CSI measurements for beam refinement for a link between the base station and the repeater node, compares CSI measurements reported from the repeater node and the UE device, and at least one of selects a beam for each link between the base station, the UE, and the repeater node, and associates beams of links between the base station, the UE, and the repeater node.

In one embodiment, the transceiver transmits to the repeater node an uplink ("UL") RS configuration from the base station for transmitting and receiving, on a same beam, signals from the UE device in a prior slot. In one embodiment, the transceiver configures different repeaters to forward repeater-specific RS to the UE device.

In one embodiment, the processor assigns CSI-RS beams to the different repeaters and configuring the different repeaters with time and directional information to forward the CSI-RS to the UE device. In one embodiment, the processor associates one of the different repeaters with ports on a given symbol with one code division multiplexing ("CDM") and associating another one of the different repeaters with ports on a same symbol but with a different CDM in response to determining that the CSI-RS ports with CDM in a frequency domain should be applied.

In one embodiment, the processor configures the UE device to report measurements of repeater-specific RS to the base station ad selects a repeater of the different repeaters that can serve the UE device for data transmission.

In one embodiment, the processor configures the UE device to report a quality of at least one configured link between the UE and a repeater node. In one embodiment, the processor configures the UE device to report a quality of at least one configured link in response to the quality of the at least one configured link satisfying a predefined quality threshold.

A second method is disclosed for repeater configuration for channel state information reference signal. The second method may be performed by a network entity such as a base node, a gNB, and/or the network equipment apparatus 800. In some embodiments, the second method may be performed by a processor executing program code, for example, a microcontroller, a microprocessor, a CPU, a GPU, an auxiliary processing unit, a FPGA, or the like.

In one embodiment, the second method includes transmitting a first configuration to a repeater node of a mobile wireless communication network, the first configuration comprising channel state information reference signal ("CSI-RS") configuration information for amplifying and forwarding CSI-RS beams to a user equipment ("UE") device from the repeater node.

In one embodiment, the second method includes transmitting a second configuration to the repeater node, the second configuration comprising configuration information for performing measurement and reporting of the CSI-RS beams. In one embodiment, the second method includes transmitting repeater-specific CSI-RS to the repeater node to be forwarded to the UE device and transmitting an indication to the UE device to report repeater-specific CSI-RS measurements to the base station.

In one embodiment, the first configuration further comprises receiving time information of a location of slots with CSI-RS and beam information for each CSI-RS symbol. In one embodiment, the beam information comprises an association of one or more antenna ports at the base station with one or more antenna ports at the repeater for each symbol such that one or more CSI-RS received from the base station are grouped for one symbol and associated with one antenna port at the repeater.

In one embodiment, the second method includes, in response to identifying that the UE device is connected to the base station through the repeater node, limiting the first configuration to a time domain and configuring the repeater node with time and beam information such that CSI-RS resource elements ("REs") for different ports are mapped to different orthogonal frequency-division multiplexing ("OFDM") symbols.

In one embodiment, the second method includes transmitting an indication to the repeater node to apply beam refinement on a single CSI-RS port beam, wherein a different beam configuration is applied for each of multiple symbols that are received on the single CSI-RS port beam from the base station.

In one embodiment, the second method includes configuring the UE device to report at least one of CSI-RS resource indicator ("CRI") reference signal received power and CRI signal-to-noise and interference ratio associated with a symbol identifier for the base station to identify a beam to be used at the repeater node.

In one embodiment, the second method includes configuring the repeater node to receive different CSI-RS resources using a same spatial filter, wherein the different CSI-RS resources are transmitted in different symbols using different beams.

In one embodiment, the second method includes configuring the repeater node with a CSI-RS resource set configuration and an indication for reporting CSI measurements for beam refinement for a link between the base station and the repeater node, compares CSI measurements reported from the repeater node and the UE device, and at least one of selects a beam for each link between the base station, the UE, and the repeater node, and associates beams of links between the base station, the UE, and the repeater node.

In one embodiment, the second method includes transmitting to the repeater node an uplink ("UL") RS configuration from the base station for transmitting and receiving, on a same beam, signals from the UE device in a prior slot. In one embodiment, the second method includes configuring different repeaters to forward repeater-specific RS to the UE device.

In one embodiment, the second method includes assigning CSI-RS beams to the different repeaters and configuring the different repeaters with time and directional information to forward the CSI-RS to the UE device. In one embodiment, the second method includes associating one of the different repeaters with ports on a given symbol with one code division multiplexing ("CDM") and associating another one of the different repeaters with ports on a same symbol but with a different CDM in response to determining that the CSI-RS ports with CDM in a frequency domain should be applied.

In one embodiment, the second method includes configuring the UE device to report measurements of repeater-specific RS to the base station ad selects a repeater of the different repeaters that can serve the UE device for data transmission.

In one embodiment, the second method includes configuring the UE device to report a quality of at least one configured link between the UE and a repeater node. In one embodiment the second method includes configuring the UE device to report a quality of at least one configured link in response to the quality of the at least one configured link satisfying a predefined quality threshold.

A third apparatus is disclosed for repeater configuration for channel state information reference signal. The third apparatus may include a user equipment apparatus 700 such as remote unit 105. In some embodiments, the third apparatus may be performed by a processor executing program code, for example, a microcontroller, a microprocessor, a CPU, a GPU, an auxiliary processing unit, a FPGA, or the like.

In one embodiment, the third apparatus includes a transceiver that receives, from a base station of a mobile wireless communication network, an indication to report repeater-specific reference signal ("RS") measurements associated with a repeater node and repeater-specific channel state information RS ("CSI-RS") and transmits, to the base station, repeater-specific RS measurements associated with the received repeater-specific CSI-RS.

In one embodiment, the transceiver receives a configuration from the base station for reporting at least one of CSI-RS resource indicator ("CRI") reference signal received power and CRI signal-to-noise and interference ratio associated with a symbol identifier for the base station to identify a beam to be used at the repeater node.

In one embodiment, the transceiver receives a configuration to report a quality of at least one configured link. In one embodiment, the transceiver receives a configuration to report a quality of at least one configured link in response to the quality of the at least one configured link satisfying a predefined quality threshold.

A third method is disclosed for repeater configuration for channel state information reference signal. The third method may be performed by a user equipment apparatus 700 such as remote unit 105. In some embodiments, the third method may be performed by a processor executing program code, for example, a microcontroller, a microprocessor, a CPU, a GPU, an auxiliary processing unit, a FPGA, or the like.

In one embodiment, the third method includes receiving, from a base station of a mobile wireless communication network, an indication to report repeater-specific reference signal ("RS") measurements associated with a repeater node and repeater-specific channel state information RS ("CSI-RS") and transmits, to the base station, repeater-specific RS measurements associated with the received repeater-specific CSI-RS.

In one embodiment, the third method includes receiving a configuration from the base station for reporting at least one of CSI-RS resource indicator ("CRI") reference signal received power and CRI signal-to-noise and interference ratio associated with a symbol identifier for the base station to identify a beam to be used at the repeater node.

In one embodiment, the third method includes receiving a configuration to report a quality of at least one configured link. In one embodiment, the third method includes receiving a configuration to report a quality of at least one configured link in response to the quality of the at least one configured link satisfying a predefined quality threshold.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A repeater node, comprising:
   at least one memory; and
   at least one processor coupled with the at least one memory and configured to cause the repeater node to:
   receive, from a base station, a first configuration comprising configuration information associated with a signal, wherein the configuration information indicates one or more resource locations within a slot, and wherein the configuration information further indicates beam information associated with each of one or more signals, wherein the beam information indicates an association of at least one antenna port associated with the base station with at least one antenna port associated with the repeater node for each of the one or more signals;

receive, from the base station, a second configuration comprising measurement and reporting configuration information for the signal;

receive repeater-specific signals to be forwarded to a user equipment ("UE"); and transmit the repeater-specific signals to the UE according to the first configuration.

2. The repeater node of claim 1, wherein the first configuration further comprises time information associated with the one or more resource locations within the slot.

3. The repeater node of claim 2, wherein one or more signals are grouped for one symbol and associated with one antenna port at the repeater node.

4. The repeater node of claim 1, wherein resource elements ("REs") for different antenna ports are mapped to different orthogonal frequency-division multiplexing ("OFDM") symbols.

5. The repeater node of claim 1, wherein the at least one processor is configured to cause the repeater node to receive an indication from the base station to apply beam refinement on a single port beam, wherein a different beam configuration is applied for each of multiple symbols that are received on the single port beam from the base station.

6. The repeater node of claim 1, wherein the at least one processor is configured to cause the repeater node to:
receive different resources using a same spatial filter, the different resources received in different symbols; and
transmit signals corresponding to the different resources using different beams.

7. The repeater node of claim 1, wherein the at least one processor is configured to cause the repeater node to receive a resource set configuration and an indication for reporting signal measurements for beam refinement for a link between the base station and the repeater node.

8. A base station, comprising:
at least one memory; and
at least one processor coupled with the at least one memory and configured to cause the base station to:
transmit, to a repeater node, a first configuration comprising configuration information associated with a signal, wherein the configuration information indicates one or more resource locations within a slot, and wherein the configuration information further indicates beam information associated with each of one or more signals, wherein the beam information indicates an association of at least one antenna port associated with the base station with at least one antenna port associated with the repeater node for each of the one or more signals;
transmit, to the repeater node, a second configuration comprising measurement and reporting configuration information for the signal;
transmit repeater-specific signals to be forwarded to a user equipment ("UE"); and
transmit an indication to the UE to report repeater-specific signal measurements to the base station.

9. The base station of claim 8, wherein the first configuration further comprises time information associated with the one or more resource locations within the slot.

10. The base station of claim 9, wherein one or more signals are grouped for one symbol and associated with one antenna port at the repeater node.

11. The base station of claim 8, wherein resource elements ("REs") for different ports are mapped to different orthogonal frequency-division multiplexing ("OFDM") symbols.

12. The base station of claim 8, wherein the at least one processor is configured to cause the base station to transmit an indication to the repeater node to apply beam refinement on a single port beam, wherein a different beam configuration is applied for each of multiple symbols.

13. The base station of claim 12, wherein the at least one processor is configured to cause the base station to configure the UE to report a reference signal received power or a signal-to-noise and interference ratio associated with a symbol identifier for the base station to identify a beam for the repeater node.

14. The base station of claim 8, wherein the at least one processor is configured to cause the base station to configure the repeater node to receive different resources using a same spatial filter, wherein the different resources are transmitted in different symbols using different beams.

15. The base station of claim 8, wherein the at least one processor is configured to cause the base station to:
configure the repeater node with a resource set configuration and an indication for reporting signal measurements for beam refinement for a link between the base station and the repeater node;
compare signal measurements reported from the repeater node and the UE; and
select a beam for each link between the base station, the UE, and the repeater node, or associate beams of links between the base station, the UE, and the repeater node.

16. The base station of claim 8, wherein the at least one processor is configured to cause the base station to:
configure different repeater nodes to forward repeater-specific reference signals to the UE; and
assign beams to the different repeater nodes and configure the different repeater nodes with time and directional information to forward the signals to the UE.

17. The base station of claim 16, wherein the at least one processor is configured to cause the base station to associate one of the different repeater nodes with ports on a given symbol with one code division multiplexing ("CDM") and associating another one of the different repeater nodes with ports on a same symbol and with a different CDM in response to determining that the ports with CDM in a frequency domain should be applied.

18. A method of a repeater node, comprising:
receiving, from a base station, a first configuration comprising configuration information associated with a signal, wherein the configuration information indicates one or more resource locations within a slot, and wherein the configuration information further indicates beam information associated with each of one or more signals, wherein the beam information indicates an association of at least one antenna port associated with the base station with at least one antenna port associated with the repeater node for each of the one or more signals;
receiving, from the base station, a second configuration comprising measurement and reporting configuration information for the signal;
receiving repeater-specific signals to be forwarded to a user equipment ("UE"); and
transmitting the repeater-specific signals to the UE according to the first configuration.

19. The method of claim 18, wherein the first configuration further comprises time information associated with the one or more resource locations within the slot.

20. A method of a base station, comprising:
transmitting, to a repeater node, a first configuration comprising configuration information associated with a signal, wherein the configuration information indicates one or more resource locations within a slot, and wherein the configuration information further indicates beam information associated with each of one or more signals, wherein the beam information indicates an association of at least one antenna port associated with the base station with at least one antenna port associated with the repeater node for each of the one or more signals;

transmitting, to the repeater node, a second configuration comprising measurement and reporting configuration information for the signal;

transmitting repeater-specific signals to be forwarded to a user equipment ("UE"); and transmitting an indication to the UE to report repeater-specific signal measurements to the base station.

* * * * *